United States Patent
Palmer et al.

(10) Patent No.: US 9,617,016 B2
(45) Date of Patent: *Apr. 11, 2017

(54) LAUNCH VEHICLE AND SYSTEM AND METHOD FOR ECONOMICALLY EFFICIENT LAUNCH THEREOF

(71) Applicants: Palmer Labs, LLC, Durham, NC (US); 8 Rivers Capital, LLC, Durham, NC (US)

(72) Inventors: Miles R. Palmer, Chapel Hill, NC (US); Glenn William Brown, Jr., Durham, NC (US)

(73) Assignee: 8 Rivers Capital, LLC, Durham, NC (US)

( * ) Notice: Subject to any disclaimer, the term of this patent is extended or adjusted under 35 U.S.C. 154(b) by 475 days.

This patent is subject to a terminal disclaimer.

(21) Appl. No.: 14/211,779

(22) Filed: Mar. 14, 2014

(65) Prior Publication Data

US 2014/0306065 A1    Oct. 16, 2014

Related U.S. Application Data

(60) Provisional application No. 61/799,931, filed on Mar. 15, 2013.

(51) Int. Cl.
*B64G 1/40*    (2006.01)
*B64G 1/00*    (2006.01)
(Continued)

(52) U.S. Cl.
CPC ............ *B64G 1/409* (2013.01); *B64G 1/002* (2013.01); *B64G 1/406* (2013.01); *F02K 9/95* (2013.01);
(Continued)

(58) Field of Classification Search
CPC .. F02K 9/95; F42B 6/006; F42B 15/10; F42B 15/12; F41B 6/006; F41B 6/00; F41A 1/04; B64G 1/406; B64G 1/002
See application file for complete search history.

(56) References Cited

U.S. PATENT DOCUMENTS 2,790,354 A * 4/1957 Yoler .................... F41B 6/00
                                                              89/8
3,016,693 A    1/1962 Jack et al.
(Continued)

FOREIGN PATENT DOCUMENTS

GB     1073144 A *  6/1967  ............ B64G 1/406
GB     2 233 076      1/1991
(Continued)

OTHER PUBLICATIONS

Allam et al., "High Efficiency and Low cost of Electricity Generation from Fossil Fuels While Eliminating Atmosperic Emissions, Including Carbon Dioxide," *Energy Procedia*, pp. 1-12.
(Continued)

*Primary Examiner* — Benjamin P Lee
(74) *Attorney, Agent, or Firm* — Womble Carlyle Sandridge & Rice, LLP

(57) ABSTRACT

The present disclosure relates to a launch system, a launch vehicle for use with the launch system, and methods of launching a payload utilizing the launch vehicle and/or the launch system. The disclosure can provide for delivery of the payload at a terrestrial location, an Earth orbital location, or an extraorbital location. The launch vehicle can comprise a payload, a propellant tank, an electrical heater wherein propellant, such as a light gas (e.g., hydrogen) is electrically heated to significantly high temperatures, and an exhaust nozzle from which the heated propellant expands to provide an exhaust velocity of, for example, 7-16 km/sec. The launch vehicle can be utilized with the launch system, which
(Continued)

can further comprise a launch tube formed of at least one tube, which can be electrically conductive and which can be combined with at least one insulator tube. An electrical energy source, such as a battery bank and associated inductor, can be provided.

81 Claims, 18 Drawing Sheets

(51) Int. Cl.
| | |
|---|---|
| *F42B 6/00* | (2006.01) |
| *F41A 1/04* | (2006.01) |
| *F42B 15/10* | (2006.01) |
| *F42B 15/12* | (2006.01) |
| *F02K 9/95* | (2006.01) |
| *F41B 6/00* | (2006.01) |

(52) U.S. Cl.
CPC ............... *F41A 1/04* (2013.01); *F41B 6/006* (2013.01); *F42B 6/006* (2013.01); *F42B 15/10* (2013.01); *F42B 15/12* (2013.01); *B64G 1/402* (2013.01); *F41B 6/00* (2013.01)

(56) References Cited

U.S. PATENT DOCUMENTS

| | | | | |
|---|---|---|---|---|
| 3,369,455 | A * | 2/1968 | Jones | F42B 15/00 102/374 |
| 3,374,668 | A * | 3/1968 | Godfrey | B64G 7/00 73/12.08 |
| 4,347,463 | A * | 8/1982 | Kemeny | F41B 6/006 124/3 |
| 4,480,523 | A | 11/1984 | Young et al. | |
| 4,577,461 | A | 3/1986 | Cann | |
| 4,590,842 | A * | 5/1986 | Goldstein | F41A 1/02 376/102 |
| 4,677,895 | A | 7/1987 | Carlson et al. | |
| 4,715,261 | A * | 12/1987 | Goldstein | F41B 6/00 124/3 |
| 4,796,511 | A | 1/1989 | Eyssa | |
| 4,821,509 | A | 4/1989 | Burton et al. | |
| 4,957,035 | A * | 9/1990 | Eskam | F41B 6/00 89/8 |
| 4,967,637 | A | 11/1990 | Löffler et al. | |
| 4,974,487 | A * | 12/1990 | Goldstein | F41B 6/00 124/3 |
| 5,012,719 | A * | 5/1991 | Goldstein | B01J 19/087 102/531 |
| 5,024,137 | A | 6/1991 | Schroeder | |
| 5,033,355 | A * | 7/1991 | Goldstein | F41B 6/00 102/430 |
| 5,072,647 | A | 12/1991 | Goldstein et al. | |
| 5,171,932 | A * | 12/1992 | McElroy | F41B 6/00 102/700 |
| 5,183,956 | A | 2/1993 | Rosenberg | |
| 5,233,903 | A * | 8/1993 | Saphier | F41B 6/00 89/7 |
| 5,640,843 | A * | 6/1997 | Aston | B64G 1/406 219/121.49 |
| 6,311,926 | B1 * | 11/2001 | Powell | B64F 1/04 104/123 |
| 6,895,743 | B1 | 5/2005 | McElheran et al. | |
| 6,921,051 | B2 | 7/2005 | Lopata et al. | |
| 6,993,898 | B2 | 2/2006 | Parkin | |
| 7,246,483 | B2 * | 7/2007 | Minick | F02K 7/00 60/204 |
| 7,775,148 | B1 | 8/2010 | McDermott | |
| 8,746,120 | B1 | 6/2014 | Nolting et al. | |
| 2011/0259230 | A1 * | 10/2011 | Sawka | F02K 9/95 102/374 |
| 2012/0175457 | A1 | 7/2012 | Hunter et al. | |
| 2012/0187249 | A1 * | 7/2012 | Hunter | F41A 1/02 244/158.5 |
| 2012/0227374 | A1 * | 9/2012 | Zegler | F02K 9/44 60/204 |
| 2014/0306065 | A1 | 10/2014 | Palmer et al. | |
| 2015/0175278 | A1 * | 6/2015 | Hunter | B64G 1/002 244/158.5 |
| 2015/0307213 | A1 | 10/2015 | Hunter et al. | |

FOREIGN PATENT DOCUMENTS

| | | | | |
|---|---|---|---|---|
| IL | WO 2005054674 A2 * | 6/2005 | ............ | B64G 1/406 |
| JP | H05-322486 | 12/1993 | | |

OTHER PUBLICATIONS

Author Unknown, "The SHARP Gas Gun," *Energy & Technology Review*, Jul. 1993, pp. 1-12.
McNab, "Launch to Space With an Electromagnetic Railgun," *IEEE Transactions on Magnetics*, 2003, pp. 295-304, vol. 39, No. 1.
Palmer et al., "High Temperature Superconductor Applications in Electromagnetic Space Launch," *Progress in High Temerature Superonductivity*, vol. 8 Wolrld Scientific Publ., Teaneck, NJ, 1988, p. 168-173.
Palmer et al., Electromagnetic Space Launch: A Re-evaluation in Light of Current Technology and Launch Needs and Feasibility of a Near Term Demonstration, *IEEE Transactions on Magnetics*, vol. 25, No. 1, Jan. 1989, pp. 393-399.
Palmer et al. "A Revolution in Access to Space Through Spinoffs of SDI Technology," Keynote Paper, 5th Symposium on Electromagnetic Launch Technology, Destin, Florida, Apr. 1990, *IEEE Transaction on Magnetics*, vol. 27, No. 1, Jan. 1991, p. 11-20.
Palmer, "Synergism in Research and Development Between Electromagnetic Guns and Spacecraft Electric Propulsion," *EIII Transactions on Magnetics*, 1993, vol. 29, No. 1. pp. 706-710.
Palmer, "Implications of Gun Launch to Space for Nanosatellite Architectures," *Proceedings of the International Conference on Integrated Micro/Nanotechnology for Space Applications*, Houston, Texas, Oct. 30, 1995, 6 pages.
Palmer, "Economics and Technology Issues for gun Launch to Space," *Space Technology International Forum*, 1996, Albuquerque, New Mexico, 6 pages.
Palmer, "Market, Cost, and Technical Factors Affecting Advanced Space Launch Technologies," *12th International Symposium on Electromagnetic Launch Technology*, Snow Bird, Utah, May 2005, 15 pages.
Turman et al., "Co-Axial Geometry Electromagnetic Launch to Space," AIAA Paper 94-4626, *AIAA Apace Programs and Technologies Conference*, Hunsville, Alabama, Sep. 29, 1994, 15 pages. http://arc.aiaa.org, DOI No. 10.2514/6.1994-4626.
Walls et al, "Application of Electromagnetic Guns to Future Naval Platforms," *IEEE Transactions on Magnetics*, 1999, pp. 262-267, vol. 35, No. 1.
Palmer et al., "Component and Subscale Testing in Support of the Design of a Battery Power Supply for the Electromagnetic Gun Research Facility," Presented Paper, IEEE Pulsed Power Conference, Washington, D.C., Jun. 29, 1987, pp. 46-49.
Palmer, "Midterm to Far Term Applications of Electromagnetic Guns and Associated Power Technology," Keynote paper, Applications Panel, 6th Symposium on Electromagnetic Launch Technology, Austin, Texas, Apr. 1992, published IEEE Transactions on Magnetics, 29(1) Jan. 1993, p. 345-348.
Palmer, "Motivation for a Near Term Gun Launch to Space Demonstration and a Variable Inductance Power Supply Concept to Minimize Initial Demonstration Costs," IEEE Transactions on Magnetics, vol. 29(1), Jan. 1993, p. 478-483.

* cited by examiner

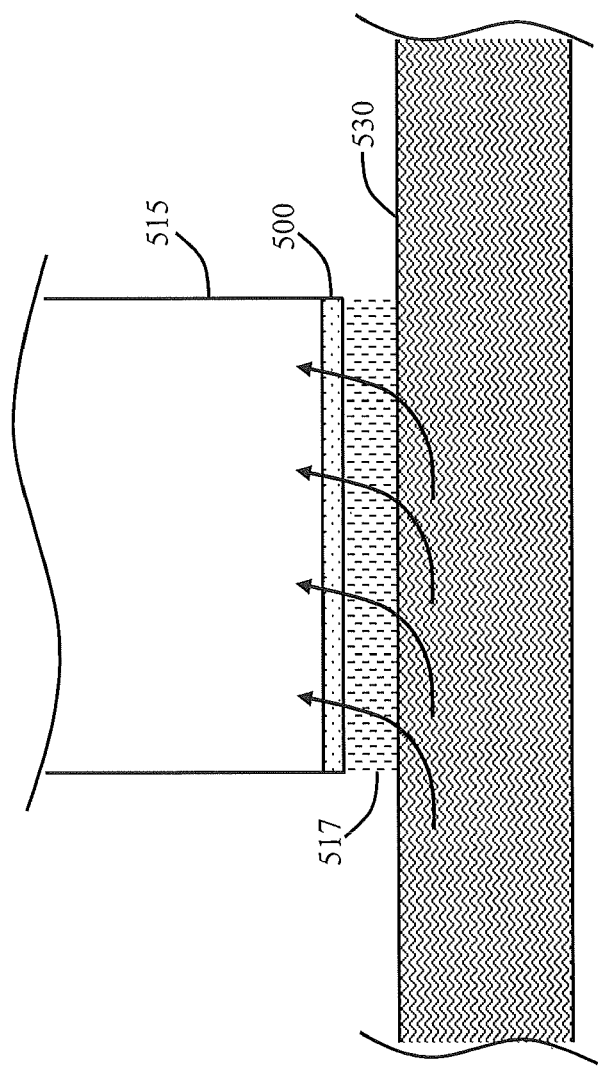

LAUNCH VEHICLE AND SYSTEM AND METHOD FOR ECONOMICALLY EFFICIENT LAUNCH THEREOF

CROSS-REFERENCE TO RELATED APPLICATIONS

The present application claims priority to U.S. Provisional Patent Application No. 61/799,931, filed Mar. 15, 2013, the disclosure of which is incorporated herein by reference in its entirety.

FIELD OF THE DISCLOSURE

The present disclosure relates to systems, methods, and apparatuses for launch of a payload. More particularly, the payload may be intended for space launch or delivery to a terrestrial location, and the present disclosure can provide for acceleration of the payload from a launch tube to its desired location.

BACKGROUND

Many means are known for accelerating an object. Relatively small projectiles are efficiently accelerated via controlled explosive charges, such as with gunpowder. As the mass of the object being accelerated increases, however, the explosive force required greatly increases. For example, chemical combustion rockets are presently the only means that have been shown to be effective for launching payloads into space. Although much work has been done in attempting to develop alternative technologies for rapid acceleration of large payloads, such as electromagnetic guns, thermal guns, and plasma arc acceleration, no alternative technology to date has been proven useful and reliable, particularly in the launch of space vehicles.

In relation to space launch, while rocket propulsion is a long proven technology, reliance solely on conventional rocket launch is problematic in that it remains expensive, dangerous, and is dominated by government funding. Such problems are illustrated by the retirement and lack of suitable replacement for the National Aeronautic and Space Administration's Space Shuttle program. The lead time for a new space launch using rocket propulsion is typically three to ten years. Space launches are infrequent, typically occurring less than once a year to a few times per year per customer. This has hampered advancements in certain technologies, such as communications. For example, satellite technologies have been slow and expensive to develop and are often outdated quickly after launch and satellite placement. These factors and attendant continued government involvement have locked in high costs and low profits. In particular, it is widely understood that present rocket launch technology can cost $2,000 to $10,000 or more per kilogram of material for placement in an earth orbit.

Many types of gun launch systems have been proposed as alternatives to rockets. Thermal guns are one previously proposed alternative. Conventional thermal guns have included powder, liquid propellant, and traveling charge thermal guns. Electrothermal guns have included pure electrothermal guns and electrothermal-chemical guns. Light gas thermal guns have included one-stage and two-stage versions. Ram cannon thermal guns have also been proposed. Electromagnetic guns are another previously proposed alternative. Coil versions of electromagnetic guns have included superconducting-type (e.g., quench or DC synchronous), brush-type (e.g., traveling wave, expanding front, and collapsing front), and inductive-type (e.g., single phase and multiphase). Rail versions of electromagnetic guns have included DES-types and breech fed-types (e.g., augmented and simple).

Proposed thermal gun systems share the common feature of being limited by the sound speed of the propelling gas. Thus, for practical engineering reasons, these gun systems are limited to roughly the speed of sound of the propelling gas. Rocket systems are not limited in this manner. Electromagnetic guns are theoretically not limited by the sound of speed of a propelling gas, but experimental results with electromagnetic launchers have indicated that the performance of the launcher does not follow theoretical predictions due to instabilities in the plasma armatures that form above velocities of 2,000 to 4,000 m/s. Above those velocities, the plasma armature instabilities excited by the high magnetic fields in the launchers cause the electrical currents to flow in undesirable places, and energy in the launcher is dissipated rather than being applied effectively to accelerating the projectile. The intractable physics of this phenomenon is similar in some ways to that of magnetic confinement fusion, which is well known to offer many barriers to practical application due to various plasma instabilities in the presence of high magnetic fields All of the foregoing gun launch approaches, both thermal and electromagnetic, share a common feature in that they impose excessively great acceleration forces on the payload. Accelerations are typically tens of thousands of G's. These accelerations are a fundamental consequence of the physics of operations of gun launch systems attempting to achieve high velocities. The maximum velocity which can be achieved by gun systems is proportional to the square root of the acceleration. Consequently, the acceleration must increase as the square of increasing launch velocity. These accelerations impose enormous challenges in designing payloads that can survive the launch and still accomplish complex tasks after launch. Despite these challenges, perceived payoffs were so high that the US government invested hundreds of millions of dollars in research and development of all the various types of gun launchers in the 1970's through the early 1990's.

A major advantage of rocket propulsion versus gun propulsion is that the ultimate velocity achievable is independent of acceleration rather than being limited to a proportion of the square root of acceleration. However, a major limitation of rocket propulsion is that the mass fraction of the total vehicle mass represented by the payload mass is limited by physics of the well known rocket equation. This physics causes the payload fraction to decline exponentially with the ratio of the ultimate achieved velocity relative to the exhaust velocity of the rocket. Chemical rockets are limited to exhaust velocities of about 2,000 to about 4,800 m/s due to the limitations of chemical reaction energies. Thus, as the total velocity required for the mission increases well beyond 4,800 m/s, the total payload fraction grows small. For reaching Earth orbit, including aerodynamic and gravity losses, the total velocity increment required is about 8,000 m/s. This being substantially higher than available chemical rocket exhaust velocities of 4,800 m/s, the payload fraction is calculated from the rocket equation as being relatively low. Compounding this problem is the parasitic mass of the necessary equipment for the rocket to function, such as, but not limited to, an engine and propellant containers. When these parasitic masses are included, it becomes necessary to limit their effects for launch to Earth orbit by breaking the total velocity into increments, or stages, so that the parasitic mass for each stage can be discarded in order to not hurt the performance of succeeding stages. Historically, two, three, and four stage rocket vehicles have been employed for launching payloads form the Earth's surface to Earth orbit. The total resulting payload fractions to orbit for such vehicles historically have ranged from about 0.5% for smaller rockets, up to about 2.5% for very large rocket systems. This means that the other portion, ranging from 97.5% to 99.5% is either thrown away entirely, or reused to a greater or lessor extent. Recent historical experience with the US space shuttle versus prior and coexistent expendable launchers has indicated that expendable launchers are more cost effective. The expected cost savings of reusability did not materialize for the space shuttle due to the high costs of repairs and refurbishment of the various parts of the space shuttle system due to the very high stresses of launch on its various components.

A few commercial entities have attempted to enter the rocket space launch market; however efficient, cost effective, and reliable launch means are yet to be proven, particularly those suitable for frequent launches. These efforts have been limited by the low payload fractions achievable with chemical rockets, and the necessity of multiple stages that are either expendable or require expensive repairs or refurbishment between launches. The persistently high costs of space launch mean government spending will continue to be an important factor in space launch technologies, and profitability will continue to remain low. Accordingly, there remains a need in the art for systems, methods, and apparatuses for reliable and efficient launch of projectiles, including space vehicles. Desirable characteristics of such systems are low to moderate accelerations, high payload fractions to orbit and escape velocity, and ability to achieve the desired velocity with a single stage rather than multiple stages.

SUMMARY OF THE DISCLOSURE

The present disclosure relates to launch vehicles, launch systems, and methods of launching a payload. The vehicles, systems, and methods can be adapted to achieve low to moderate accelerations, high payload fractions to orbit and escape velocity, and ability to achieve orbital and escape velocity with a single stage. The disclosure provides for delivery of the payload to any desired location on Earth, in earth orbit, or in space generally. The payload can comprise a variety of objects, including satellites, raw materials or resources, ballistics, and the like. The payload further can include human passengers.

The presently disclosed vehicles, systems, and methods benefit from one or more of: 1) low cost per unit energy high current pulsed power supply; 2) efficiently conducting electric power from a fixed power supply through an evacuated launch tube to a moving electric rocket propelled payload in such a way that minimal to near zero magnetic fields are produced; 3) stable, efficient conducting of power and energy from the launch tube wall conductors to the moving vehicle; and 4) high thrust to weight electric rocket thruster with high specific impulse.

In one aspect, the present disclosure provides a launch vehicle. Preferably, the launch vehicle is adapted for high velocity delivery of a payload. In certain embodiments, the launch vehicle can comprise the following: a payload container; a propellant tank containing a propellant; an electrical heater in fluid connection with the propellant tank and adapted for electrical heating of the propellant to form an exiting exhaust; and one or more electrical contacts adapted for directing flow of electrical current through the electrical heater. In further embodiments, the launch vehicle also can comprise an expansion nozzle in fluid communication with the exiting exhaust from the electrical heater. In some embodiments, the electrical heater can be a resistive heater. In particular, the resistive heater can comprise an electrically heated porous cylinder inside a containment vessel. Specifically, the electrically heated porous cylinder can comprise tungsten walls. In further embodiments, the electrical heater can be an arc heater. Preferably, the arc can be a swirl stabilized vortex arc. Further, the arc heater can comprise a swirl chamber inside a containment vessel. In some embodiments, the arc heater can comprise coaxial electrical terminals spaced apart by the swirl chamber. In other embodiments, the electrical contacts can be sliding electrical contacts.

In a further aspect, the present disclosure provides a launch system. In various embodiments, the launch system can comprise the following: a launch vehicle as described herein; a launch tube comprising two or more concentric, electrically conductive tubes separated by an insulator, the launch tube being adapted for propulsion of the launch vehicle therethrough; and an electrical energy source. In some embodiments, the electrical energy source can comprise a battery bank. In further embodiments, the electrical energy source further can comprise an inductor.

In still another aspect, the present disclosure provides a method for launching a payload. In certain embodiments, the method can comprise the following steps: providing the payload in a payload container of a launch vehicle included in the launch system as described herein; and electrically heating the propellant in the electrical heater to form the exiting exhaust at a velocity sufficient to propel the payload out of the launch tube.

In further embodiments, the present disclosure can be characterized by a number of different embodiments. In particular, the presently disclosed launch vehicle, launch system, and method for launching a payload can be defined by one or more of the following.

The disclosure encompasses a launcher in which a launch package is accelerated from a launch tube using material exhausted from the launch package wherein the exhaust is formed by the heating of a low atomic weight element contained within (or in front of and in contact with) the launch package, wherein the energy used for such heating is provided electrically to the launch package from the launch tube walls. In some embodiments, the launcher can be located on the earth. In other embodiments, the launcher can be located in free space or on another celestial body.

The systems and methods of the present disclosure can be configured to achieve an exit velocity is in the range of about 2,000 to about 50,000 m/sec, about 4,000 to about 30,000 m/sec, about 6,000 to about 15,000 m/sec, or about 8,000 to about 12,000 m/sec. In some embodiments, the launch package can be first accelerated to an initial velocity of about 100 to about 5,000 m/sec using a single stage light gas gun. In further embodiments, the velocity achieved with the single stage light gas gun can be about 500 to about 3,000 m/sec or about 1,500 to about 2,500 m/sec. The light gas for the single stage light gas gun can be preheated. For example, the gas for the single stage light gas gun can be electrically heated. In some embodiments, the electrical heating can be derived from the same energy supply as the launcher.

The tube can be constructed with two concentric conductors one inside the other with minimum thickness of insulation between them so as to minimize the volume of the magnetic field "charged up" by the high drive currents going down and back up the tube to drive a launch package heater. This magnetic field energy has several deleterious effects.

An undesired magnetic field requires energy which does not help propel the launch package. The undesired magnetic energy may be discharged immediately upon launch and can cause catastrophic damage if the energy level is not minimized (as is achieved by the present disclosure). This has caused prior art launchers, such as railguns, to fail to achieve high velocities. The magnetic field produces high mechanical forces and stresses which cause breakdown or higher cost or wear.

This also has caused prior art launchers, such as railguns, to fail to achieve high velocities. The magnetic field produces high induced voltages which can cause arcing in places where it is not wanted and can cause wear or catastrophic damage or failure. The magnetic field produces a force on any arc formed between the launch tube conductors and the sliding contacts that transmit electrical current and energy to the launch package. Usually these forces cause the arc to blow forward at accelerations and velocities far higher than the launch package. The electrical current is then diverted away from where it is wanted and needed to propel the launch package to a different area where it is not wanted, causing loss of energy, retarding of the launch package, wear, and/or catastrophic damage and/or failure. This further has caused prior art launchers, such as railguns, to fail to achieve high velocities.

The present disclosure provides an "electroantimagnetic" launcher. Prior art railguns and coil guns actively induced formation of magnetic forces to propel the launch package. The required generation of very high magnetic fields led to the aforementioned deleterious effects. Beneficially, the systems and methods of the present disclosure can be configured to minimize magnetic fields.

The present disclosure uses the force of hot expanding gas formed by electrical heating facilitated by tube-conducted electrical energy. In some embodiments, the present disclosure utilizes expansion of hot, light gas. For example, hydrogen can be heated above 5,000 K and result in an expelled gas consisting of individual atoms of hydrogen. In some embodiments, heating can be up to 100,000 K, which can result in the exhaust velocity being up to 77,000 m/sec. Launch velocity can be as great as 150,000 m/sec or about two times the exhaust velocity. Maximum velocities can be limited to use in space since the practical limit for launch from the surface of the Earth is about 100,000 m/sec due to aerodynamic forces at that speed, which can reach about 1,000,000 PSI.

Velocities with Earth launch can practically reach about 50,000 m/sec which produces 250,000 PSI, which can be mitigated using appropriate construction, such as addition of transpiration cooled metal nosetips or the like. Velocities with Earth launch can practically reach about 18,000 m/sec, which produces about 30,000 PSI, which can be mitigated using appropriate constructions, such as by addition of ablating carbon nosetips or the like. Another limit is imposed by launcher length when people are launched. Velocities for launchers ferrying human passengers can be limited to an acceleration of no more than about 20 G's. Using a launch tube with a length up to about 1,000 km can safely lead to velocities of up to about 20,000 m/sec.

The light gas for expansion can be heated, for example, in an electrical heater. In other embodiments, the heater can be a resistive heater, or the heater can be an arc heater. In some embodiments, the heating element can be a transpiration tube element, and/or the heater wall can be cooled by transpiration.

The light gas can be seeded with an ionizable element to promote arc stability and conductivity and ionization. Non-limiting examples of suitable ionizable elements include cesium, rubidium, potassium, sodium, and lithium The conductive sliding contacts can be configured to be in a mechanical sliding arrangement with the tube walls and can exhibit a low voltage drop. In some embodiments, the sliding arrangement can include physical contact between the contacts and the tube walls. In specific embodiments, the conductive sliding contacts can be configured to make an arcing sliding contact with the tube walls with a minimized voltage drop. The arc can be contained via mechanical containment using, for example, a sliding insulating perimeter. In some embodiments, the arc can be contained via magnetic forces. For example, the magnetic forces can be generated by the current transferring through the contact via a specially shaped current loop. In other examples, the magnetic forces can be generated by a self contained power source on the launch package. In further examples, the magnetic forces can be generated by a magnet, such as a permanent magnet or a superconducting magnet. In some embodiments, the sliding contact can be cooled by transpiring fluid. For example, the transpiring fluid can be a light gas, which may be generated from the propellant tank of the launch vehicle or may be from an independent source. In other embodiments, the sliding contact can be cooled by material in the sliding contact melting or vaporizing. When utilized, the transpiring fluid can be conductive. In particular, the transpiring fluid can be a low melting metal having a low ionization potential. For example, the low melting metal can be cesium, aluminum, lithium, or analogous low melting soft metals with low ionization potentials. The sliding contacts can include an insulating perimeter, which can be transpiration cooled. The transpiration fluid for such cooling can be an insulating material such as hydrogen, sulfur hexafluoride, or other liquid or gas. At least a portion of the sliding contact can be adapted to exhibit one or more state transitions. For example, the sliding contact can define a sliding solid—solid interaction with a solid tube wall that transitions to a liquid—solid interaction when at least a portion of the sliding contact that interacts with the tube wall transitions to a liquid metal melt. Such state transition can occur in some embodiments at a launcher velocity of about 1000 to about 2000 m/sec. For example, the state can transition to an arcing contact at a velocity of about 1500 to about 3000 m/sec. Arc voltage can be about 100 to abut 300 V. The arc can be stably positioned at the contact and may not substantially move outside of the desired contact region.

The conductive tube walls can have slotted tracks of varying numbers and geometries for the sliding contacts to make contact with conductive strips. The tracks can be configured to substantially prevent arcing between the tube conductors and can be configured to align the launch package and substantially prevent it from rotating in the tube. In some embodiments, conductive strips can define longitudinal tracks extending along at least a portion of the length of the conductive tube. In particular, the conductive strips can be coaxial with the conductive tube.

In some embodiments, the conductive tube walls can have layers of different materials. For example, the materials can be predominately steel or aluminum. In some embodiments, the innermost layer can be a high temperature wear resistant conductive material such as tungsten or rhenium or hardened copper. Further, an interlayer of material can be provided between the predominant outer layer and the innermost layer. In exemplary embodiments, the interlayer can be copper or molybdenum. In some embodiments, a majority of the inner surface of the conductive tube walls can be coated with an insulator. For example, substantially all of the inner surface of the conductive tube walls apart from the sections defined by the conductive strips can be coated with an insulator. The insulator on the inner wall of the conductive can be, for example, a ceramic or a composite. In some embodiments, there can be one current outbound path in series with one return current path. In other embodiments, there can be multiple current outbound paths in parallel, and all can be in series with multiple return current paths. The launcher inductance can be lowered proportionately to the number of parallel current paths. Beneficially, the lower inductance can lower the magnetic field energy and thus the detrimental effects of the magnetic field.

In some embodiments, the slotted track insulators can be transpiration cooled and/or the conductive strips can be transpiration cooled. The transpiration fluid can be, for example, a conductive material. Any further means for cooling the conductive strips that substantially avoids dispersal of materials rearward to the moving launch vehicle (and thus avoids undesirable arc formation) also may be used.

The propellant tank can have an outer diameter that is substantially identical to the inner diameter of the launch tube. The propellant tank can include sliding contact strips on at least a portion of its outer surface. The sliding contact strips can be configured to vaporize as the velocity of the launch vehicle increases. Such vaporized strips can provide a low drag gas bearing to minimize frictional drag. Such vaporized strips can produce a vapor that is insulating so that it inhibits rather than promotes any arcing. In some embodiments, the sliding contact strips can comprise pores filled with liquid sulfur hexafluoride or other suitable material.

A device can be inserted into the conductive launch tube for inspection, alignment, and repair. In some embodiments, the launch tube can be aligned by active alignment devices.

The launch tube can be substantially horizontal except near the exit end where it curves upward (i.e., in the launch direction). In some embodiments, the launch tube can follow the curvature of the Earth. In other embodiments, the launch tube can be at a constant slope angle. If desired, the tube bed can be graded to the tube constant slope angle.

The launch tube can be evacuated and backfilled with a low pressure of light gas to minimize aerodynamic drag during acceleration while providing increased resistance to arc breakdown ahead of the launch package. In some embodiments, the launch tube can be evacuated, and a high speed pulse of gas can be introduced time sequentially along the tube (e.g., via transpiration) to coat the walls with a layer of gas which insulates the walls but does not have time to expand into the majority of the tube diameter and thus increase aerodynamic drag. In some embodiments, an initial section of the launch tube can be configured so as to not be electrical conductive. The launch vehicle can be accelerated through such initial section of the launch tube utilizing an expanding gas that is not electrically heated or that is preheated by electrical or other means prior to the launch initiation.

The launch tube exit can be sealed with an exit device to prevent air ingress until the launch package arrives. In some embodiments, the exit device can be a high speed mechanical shutter, can be one or a series of aerodynamic curtains, or can be a thin membrane or membranes which the launch package flies through. In some embodiments, the exit device can be a thin membrane or membranes, with one or several small explosive charges which destroy the launch package if not detonated prior to launch package arrival and which allow the launch package to pass if detonated prior to launch package arrival.

In some embodiments, the launch tube can be moveable. For example, the launch tube can be moveable in one dimension to change launch elevation or launch azimuth. Further, the launch tube can be moveable in two dimensions to enable change in both elevation and azimuth. In some embodiments, the launch tube can be mounted on a moveable vehicle such as a ship or a submarine. Alternatively, the launch tube can be installed in a slanted tunnel underground or can be installed on naturally sloping ground. In some embodiments, the launch tube can be installed underwater at fixed or movable angles.

The launch package can have inertial sensors and actuators which actively maintain its alignment and orientation while being accelerated in the launch tube. In some embodiments, the launch package can be monitored during the launch acceleration interval for integrity and nominal performance. Emergency procedures can be implemented based on monitoring results to optimize the launch and to protect the launch tube. For example, the launch can be aborted by destroying the launch package immediately or shortly after its exit from the launch tube. As a further example, the launch package can be separated during or immediately after launch into a discarded portion and a flyout payload portion. The flyout payload can have a heat shield with an extruding rod or transpiration cooled nosetip to maintain the nosetip integrity, shape, sharpness, low drag, and low pressure moment during exit from the atmosphere. The flyout payload can have a small positive stability, neutral stability, or a negative aerodynamic stability based on its center of pressure location relative to its center of mass location. The flyout payload can maneuver at high lateral acceleration levels to optimize flight path through the atmosphere and change launch azimuth. The flyout payload can have a high lift to drag ratio and can have a lifting body design. For example, the flyout payload can have aerodynamic control surfaces with very high speed response and low drag. In some embodiments, the control surfaces can be base split flaps and/or can be actuated with piezoelectric actuators.

In some embodiments, the atmosphere (e.g., air) in front of the payload (i.e., the volume of the launch tube forward to the moving launcher) can be heated so as to create a partial vacuum and thereby decrease aerodynamic drag on the payload. For example, a high energy laser system can project a focus a laser beam ahead of the payload to explosively heat the air.

In some embodiments, the flyout payload can be an orbital satellite or can be a suborbital payload. In exemplary embodiments, a payload satellite can be a communications satellite, a sensor satellite, a resupply vehicle, or a weapon. In an embodiment, the payload is a commercial package to be delivered rapidly to long distances. In another embodiment, the payload is a sensor payload or a UAV or other unmanned vehicle. In a further embodiment, the payload is a weapon. In yet another embodiment, the payload contains subparts that are dispersed before impact. In other embodiments, the payload remains intact until impact. If desired, multiple payloads can impact at or near the same location for deep penetration. A payload satellite can contains an inflatable solar array for power, and such array can harden to rigidity after deployment. A payload satellite can contain an inflatable magnet array to provide for attitude control in orbit, and such array can harden to rigidity after deployment. A payload satellite can contain an inflatable antenna array to effect communications in orbit, and such array can harden to rigidity after deployment. A payload satellite can contain inflatable structures to effect missions in orbit, and such structures can harden to rigidity after deployment.

The design lifetime of a payload satellite can be less than 10 years, less than 5 years, less than 2 years, or less than 1 year. The satellite orbital altitude can be such that the orbital lifetime due to aerodynamic drag is less than 5 years, less than 2 years, less than 1 year, less than 6 months, less than 3 months, or less than 1 month. The satellite can be configured to achieve longer orbital lifetime through magnetic thrust against the Earth's magnetic field using an inflatable magnetic array. The satellite can be configured to achieve longer orbital lifetime through pressure induced by sunlight and solar wind on an inflatable solar sail. The satellite can be configured to achieve longer orbital lifetime through magnetohydrodynamic (MHD) propulsion against ionized upper atmosphere molecules. The payload cost can be reduced through using commercial grade parts with high initial failure rates and then iterating quickly through launch, fail, and redesign cycles to achieve higher and higher reliability quickly over time.

In some embodiments, a launcher according to the present disclosure and a plurality of payloads (e.g., thousands) can be designed simultaneously for a single purpose. For example, the payloads can all be communications satellites, such as radiofrequency communication satellites or optical communications satellites. In some embodiments, the payloads can be reflective relays for millimeter waves or optical beams. In other embodiments, the payloads can be nuclear waste containers.

The light gas propellant for the launch package and/or the single stage light gas gun pre-accelerator can be, for example, hydrogen. In some embodiments, the light gas can be heated in the range of about 1,000 to about 100,000 K, about 2,000 K to about 50,000 K, about 2,500 K to about 20,000 K, about 3,000 K to about 15,000 K, about 3,500 K to about 10,000 K, or about 3,500 to 5,000 K.

The exhausted gas can differ in various embodiments. For example, the exhausted gas can be molecular hydrogen (0.002 kg/mole), atomic hydrogen (0.001 kg/mole), and/or hydrogen plasma (0.0005 kg/mole).

The launch package exhaust device can contain a nozzle throat, which optionally can be transpiration cooled with a light gas (e.g., hydrogen). The exhaust device also can contain a nozzle, which optionally can be transpiration cooled with a light gas (e.g., hydrogen). The exhaust device can contain a porous nozzle throat and, in some embodiments, the pores can be filled with a material that absorbs heat by melting and/or vaporization and/or disassociation (e.g., solid hydrogen or lithium or ice). The exhaust device also can contain a porous nozzle and, in some embodiments, the pores can be filled with a material that absorbs heat by melting and/or vaporization and/or disassociation (e.g., solid hydrogen or lithium or ice).

The flyout payload can have a heat shield with a porous nosetip filled with a material (e.g., solid hydrogen or lithium or ice) that absorbs heat by melting and/or vaporization and/or disassociation to maintain the nosetip integrity, shape, sharpness, low drag, and low pressure moment during exit from the atmosphere. The flyout payload nosetip may include an extruding rod, which can be forced outward as the rod ablates.

The electrical energy for the launch system can be supplied by a battery bank. In various embodiments, the batteries can be lead acid batteries. Automotive batteries may be used in some embodiments. An inductor can be interposed between the battery bank and the launcher such that the battery bank charges the inductor and then the inductor is switched over to and discharges into the launcher tube. The discharge into the launcher can be initiated by explosively actuated switches. The discharge switching can be accomplished with conventional switches with capacitor mediated arcing control. The inductor can have a core composed of a high permeability material. The core can be designed for high discharge rates and low eddy current losses. The inductor can be actively cooled and/or the core can be actively cooled. In some embodiments, the conductors can be actively cooled.

In some aspects, the present disclosure provides a launch vehicle that can be configured for delivery of a payload. The launch vehicle can be adapted for high velocity delivery of a payload. In some embodiments, the launch vehicle can comprise: a payload container; a propellant tank containing a propellant; an electrical heater in fluid connection with the propellant tank and adapted for electrical heating of the propellant to form an exiting exhaust; and one or more electrical conductors configured to direct flow of electrical current from an external source to the electrical heater. In various embodiments, one or more of the following can describe a launch vehicle according to the present disclosure.

The launch vehicle can comprise an expansion nozzle in fluid communication with the exiting exhaust from the electrical heater.

The electrical heater can be a resistive heater.

The resistive heater can comprise an electrically heated porous cylinder inside a containment vessel.

The electrically heated porous cylinder can comprise carbon walls.

The carbon walls can include a coating material selected from the group consisting of diamond, tungsten, hafnium carbide, and combinations thereof.

The electrically heated porous cylinder can be a transpiring tungsten-containing cylinder.

The resistive heater can comprise a discharge port in fluid communication with a chamber that can be internal to the containment vessel and external to the electrically heated porous cylinder.

The electrical heater can be an arc heater.

The arc heater can comprise a swirl chamber within a containment vessel.

The containment vessel can comprise transpiration cooled walls.

The swirl chamber can be configured to establish a swirl stabilized electrical vortex arc.

The arc heater can comprise coaxial electrical terminals spaced apart by the swirl chamber.

The electrical conductors can comprise sliding electrical contacts.

The sliding electrical contacts can comprise an inner conductor at least partially surrounded by an outer rim.

The outer rim can be configured for transpiration cooling.

The outer rim can be porous.

The pores in the porous outer rim can be at least partially filed with a cooling material.

The cooling material can be selected from the group consisting of hydrogen, sulfur hexafluoride, and combinations thereof.

The sliding electrical contacts further can comprise one or more of a magnetic rim, an ablative shield, an inner cooled rim, and an ablative rim between the inner conductor and the outer rim.

The sliding electrical contacts can be configured to receive the electrical current from a plasma arc.

The electrical conductors further can comprise aligning arms extending between the sliding electrical contacts and the electrical heater.

The electrical conductors can comprise elongated conductive elements attached to or integral with one or both of the payload container and the propellant tank.

The elongated conductive elements can be configured to receive the electrical current from a plasma arc.

The propellant tank can comprise one or more sliding contact strips on at least a portion of an outer surface of the propellant tank.

The sliding contact strips can be configured to be vaporizable.

The payload container can comprise one or more of a human or animal passenger, a satellite, a vehicle, a commodity, and a weapon.

One or all of the payload container, the propellant tank, and the electrical heater can be reusable.

The propellant can be selected from the group consisting of hydrogen, diborane, ammonia, methane, and combinations thereof.

The vehicle can be configured to provide a specific impulse (Isp) of at least 500 sec.

The electrical heater can be configured to heat the propellant to a temperature of about 1,000 K to about 100,000 K.

The exiting exhaust can be selected from the group consisting of molecular hydrogen, atomic hydrogen, hydrogen plasma, and combinations thereof.

The payload container can comprise a heat shield.

At least a portion of the heat shield can be configured for transpiration cooling.

The vehicle can be configured to provide a thrust to weight ratio of greater than 10:1.

The launch vehicle further can comprise a propellant pump in fluid communication with the propellant tank and the electrical heater.

The propellant pump can be a pyrotechnically driven pump or can be an electrically driven pump.

In some aspects, the present disclosure provides a launch system. In some embodiments, the launch system can comprise a launch tube that can include at least one tube configured for transmission of energy therethrough. The launch system can comprise a launch vehicle according to any of the embodiments described herein. For example, the launch vehicle can comprise a payload container, a propellant tank containing a propellant, an electrical heater in fluid connection with the propellant tank and adapted for electrical heating of the propellant to form an exiting exhaust, an optional propellant pump in fluid communication with the propellant tank and the electrical heater, and one or more electrical conductors configured to direct flow of electrical current to the electrical heater. The launch system further can comprise an electrical energy source. The launch tube in particular can be configured for propulsion of the launch vehicle therethrough. In various embodiments, one or more of the following can describe a launch system according to the present disclosure.

The launch tube can comprise an inner electrically conductive tube and an outer electrically conductive tube separated by a coaxial insulator tube.

The inner electrically conductive tube can comprise one or more slotted tracks extending at least partially along the length thereof.

The one or more slotted tracks can be configured to receive the electrical conductors of the launch vehicle.

The ratio of the radius of the outer electrically conductive tube to the radius of the inner electrically conductive tube can be 2.

The launch tube can be configured to limit any magnetic field formed by passage therethrough of an electrical current of about 0.2 to about 2 million amps such that the magnet field can be at a strength of less than about 1.25 Tesla.

The launch tube can be evacuated of ambient air.

The launch tube can comprise a tube bore surrounded by an insulator tube and an electrically conductive tube, and the launch tube can be configured for passage of electrical current through an induced plasma arc within the launch tube bore.

The electrically conductive tube can be separated from the launch tube bore along the length thereof by the insulator tube but can be in electrical connection with the launch tube bore proximate a terminal end of the launch tube.

The launch system further can comprise a rearward electrically conductive element at an opposing, beginning end of the launch tube.

The system can be configured for passage of electrical current forward through the electrically conductive tube and rearward through the launch tube bore and the one or more electrical conductors of the launch vehicle to the rearward electrically conductive element.

The induced plasma arc can be present forward of the launch vehicle and rearward of the launch vehicle.

The launch tube can comprise two electrically conductive tubes and two insulator tubes.

The launch tube can comprise a tube bore surrounded by an inner insulator tube and an outer insulator tube separated by an inner electrically conductive tube and also can comprise an outer electrically conductive tube exterior to the outer insulator tube.

The inner insulator tube and the inner electrically conductive tube can be segmented along at least a portion of the length thereof.

The segments each can include at least one switch configured to pass an electrical current from the launch bore to the inner electrically conductive tube.

The outer electrically conductive tube can be in electrical connection with the launch tube bore proximate a terminal end of the launch tube.

The launch tube can be configured for passage of electrical current through an induced plasma arc within the launch tube bore.

The system can be configured for passage of electrical current forward through the outer electrically conductive tube and rearward through the launch tube bore and the one or more electrical conductors of the launch vehicle.

The system can be configured for passage of the electrical current from the one or more electrical conductors of the launch vehicle through one or more switches positioned along the length of the inner insulator tube and into the inner electrically conductive tube.

The launch system can be configured to be electroantimagnetic.

The electrical energy source can comprise a battery bank.

The electrical energy source further can comprise an inductor.

The electrical energy source can comprise a beaming element configured to deliver a power beam.

The electrical energy source can comprise a tracking element configured to track the launch vehicle in motion through the launch tube.

The launch tube can comprise one or more passages along at least a portion of the length thereof, the one or more passages being configured to permit transmission of the power beam therethrough.

The power beam can comprise a laser beam, a microwave beam, or a millimeter wave beam.

In some aspects, the present disclosure provides methods for launching a payload. In some embodiments, a method of launching a payload can comprise providing a launch system according to any of the embodiments described herein and electrically heating propellant in an electrical heater of a launch vehicle from the launch system to form exiting exhaust at a velocity sufficient to accelerate the payload through and out of a launch tube from the launch system. In various embodiments, one or more of the following can describe a method of launching a payload according to the present disclosure.

The method can comprise electrically heating the propellant in the electrical heater of the launch vehicle to form an expanding gas that accelerates the launch vehicle through the launch tube to a velocity of at least about 2,000 meters per second (m/s) with an acceleration force of about 2 to about 2,000 G's while limiting a magnetic field within the tube to no more than about 2 Tesla.

The method can comprise providing an electrical current of about 0.2 amps to about 2 million amps through the at least one electrically conductive tube of the launch tube.

The electrical current can be provided to a first electrically conductive tube, can pass from the first electrically conductive tube through a first sliding contact to the electrical heater of the launch vehicle, and can pass from the electrical heater though a second sliding contact to a second electrically conductive tube.

The electrical current can pass from the first electrically conductive tube to the first sliding contact and can pass from the second sliding contact to the second electrically conductive tube via a plasma arc.

The electrical current can be provided to at least one electrically conductive tube and can pass forward through the electrically conductive tube toward a terminal end of the launch tube.

The electrical current can pass from the at least one electrically conductive tube and into an open bore of the launch tube through which the electrical current can pass to a first electrical conductor of the launch vehicle.

The electrical current can pass through the open bore of the launch tube via a plasma arc.

The electrical current can pass from the first electrical conductor of the launch vehicle to the electrical heater and can pass away from the launch vehicle through a second electrical conductor of the launch vehicle.

The electrical current passing away from the launch vehicle can move rearward through the open bore of the launch tube to a rearward electrically conductive element.

The electrical current can be provided to a first electrically conductive tube and can pass forward through the first electrically conductive tube toward a terminal end of the launch tube.

The electrical current can pass from the first electrically conductive tube and into an open bore of the launch tube through which the electrical current can pass to a first electrical conductor of the launch vehicle via a plasma arc.

The electrical current can pass from the first electrical conductor of the launch vehicle to the electrical heater and can pass away from the launch vehicle through a second electrical conductor of the launch vehicle.

The electrical current passing away from the launch vehicle can pass through one or more switches into a second electrically conductive tube and pass rearward therethrough.

The electrical energy source can comprise a beaming element configured to deliver a power beam, and the method can comprise directing the power beam from the beaming element to the electrical heater of the launch vehicle through one or more passages in the launch tube.

The method can comprise tracking the power beam to the position of the launch vehicle as the launch vehicle accelerates through the launch tube such that the power beam can be delivered to the launch vehicle at a plurality of positions along the length of the launch tube.

The power beam can be a laser beam, a microwave beam, or a millimeter beam.

The method can comprise heating the atmosphere forward to the launch vehicle.

The atmosphere can be explosively heated with a laser beam.

BRIEF DESCRIPTION OF THE FIGURES

Figure 1:
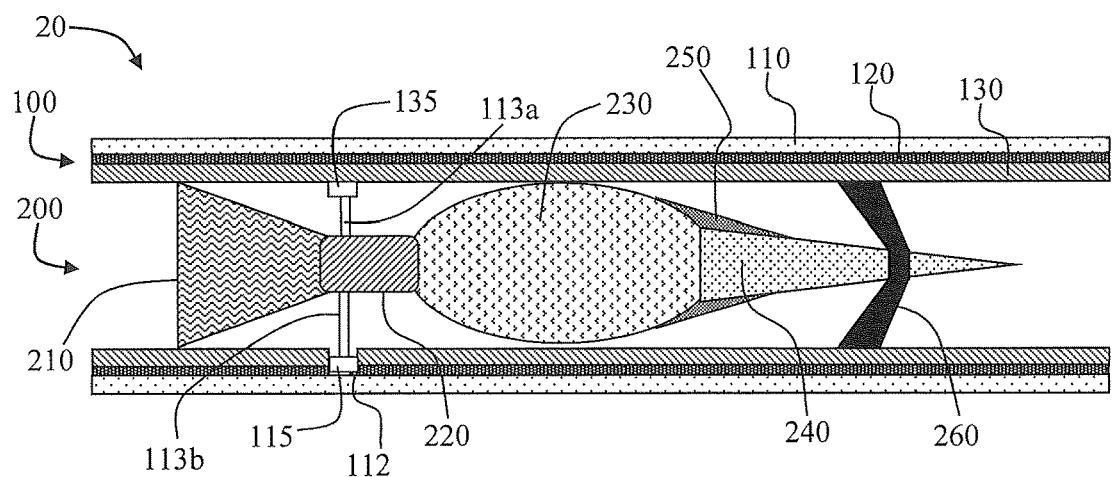
Figure 2:
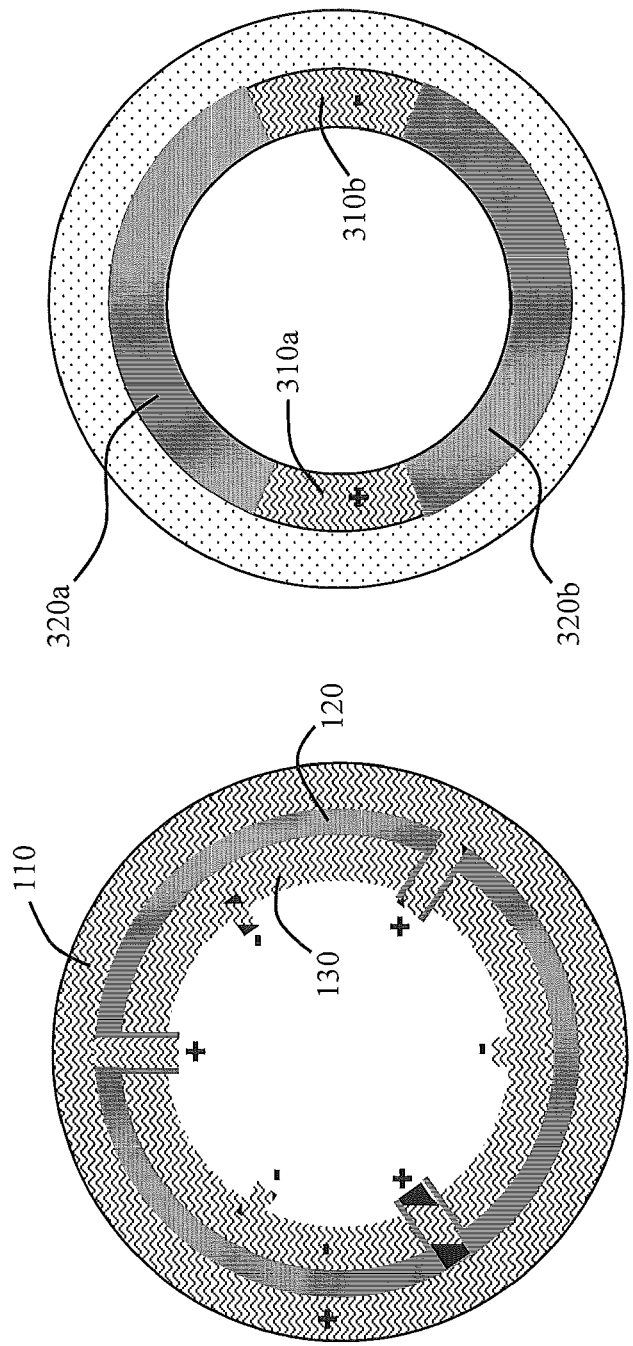
Figure 3:
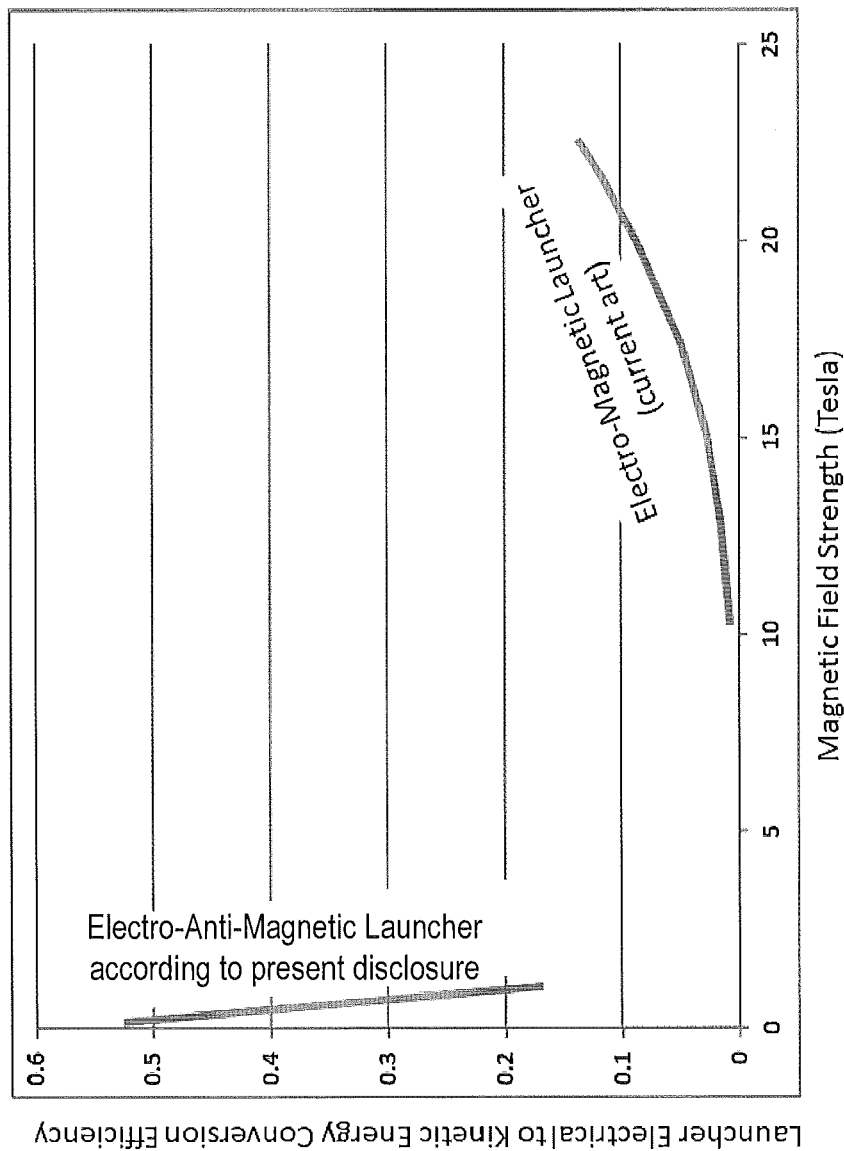
Figure 4:
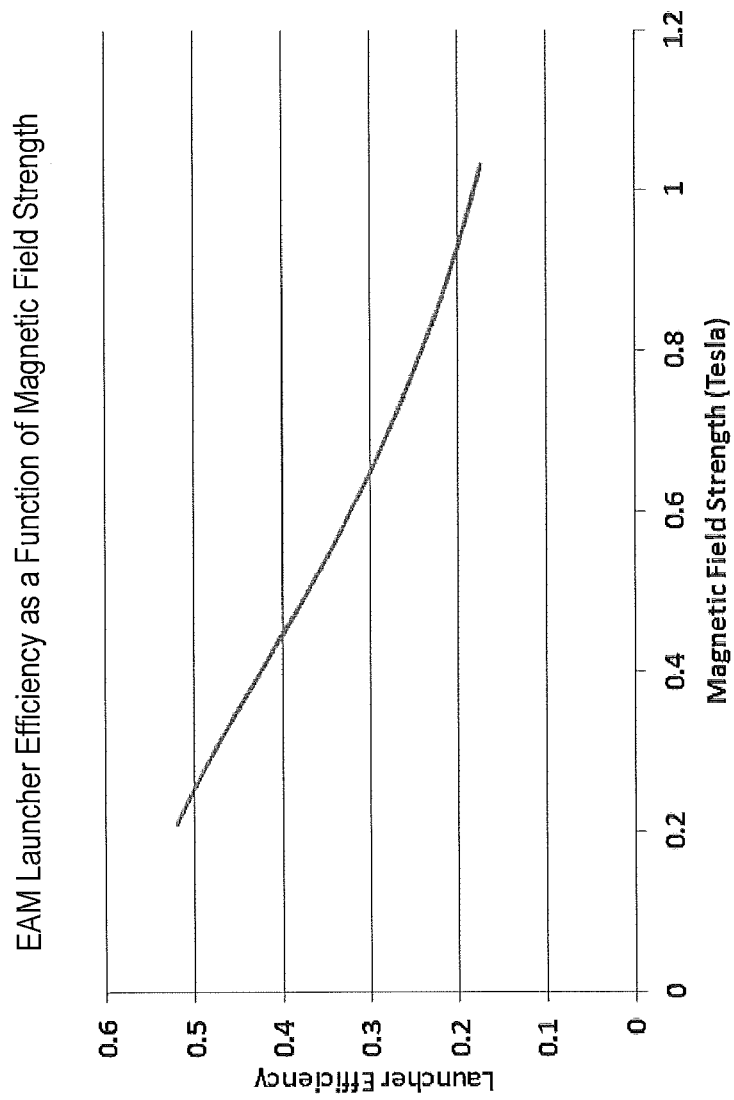
Figure 5:
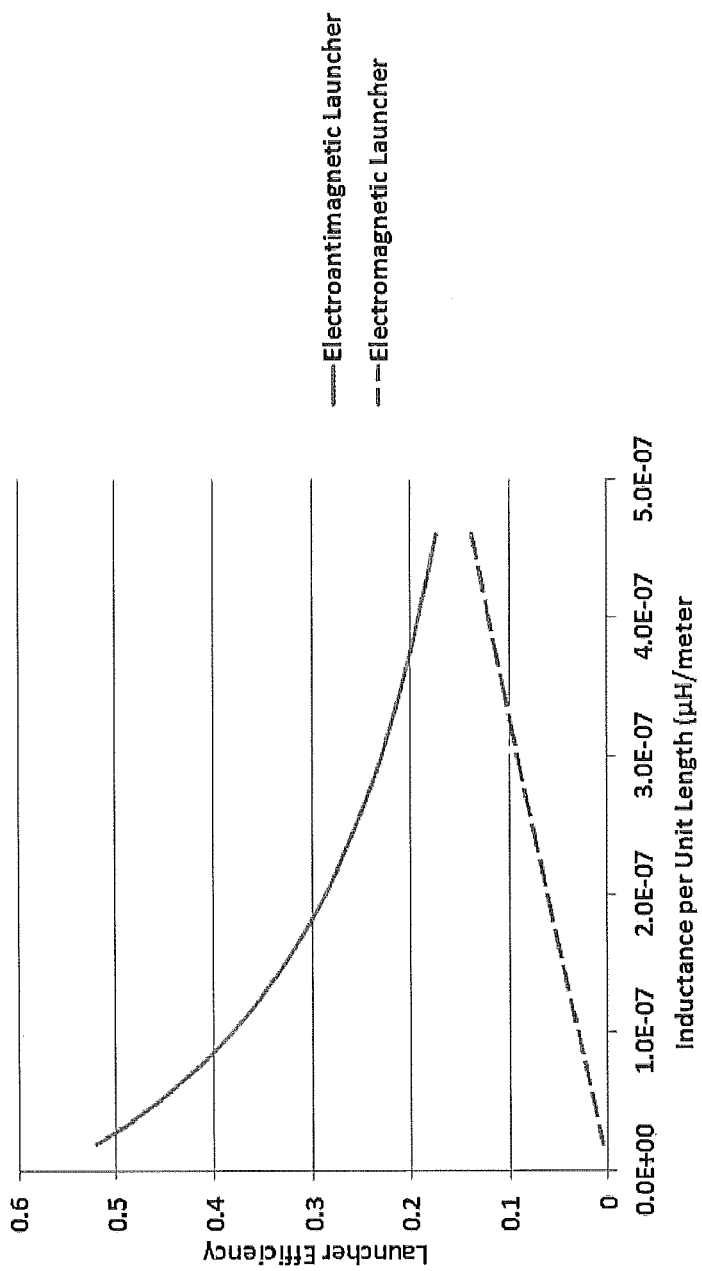
Figure 6:
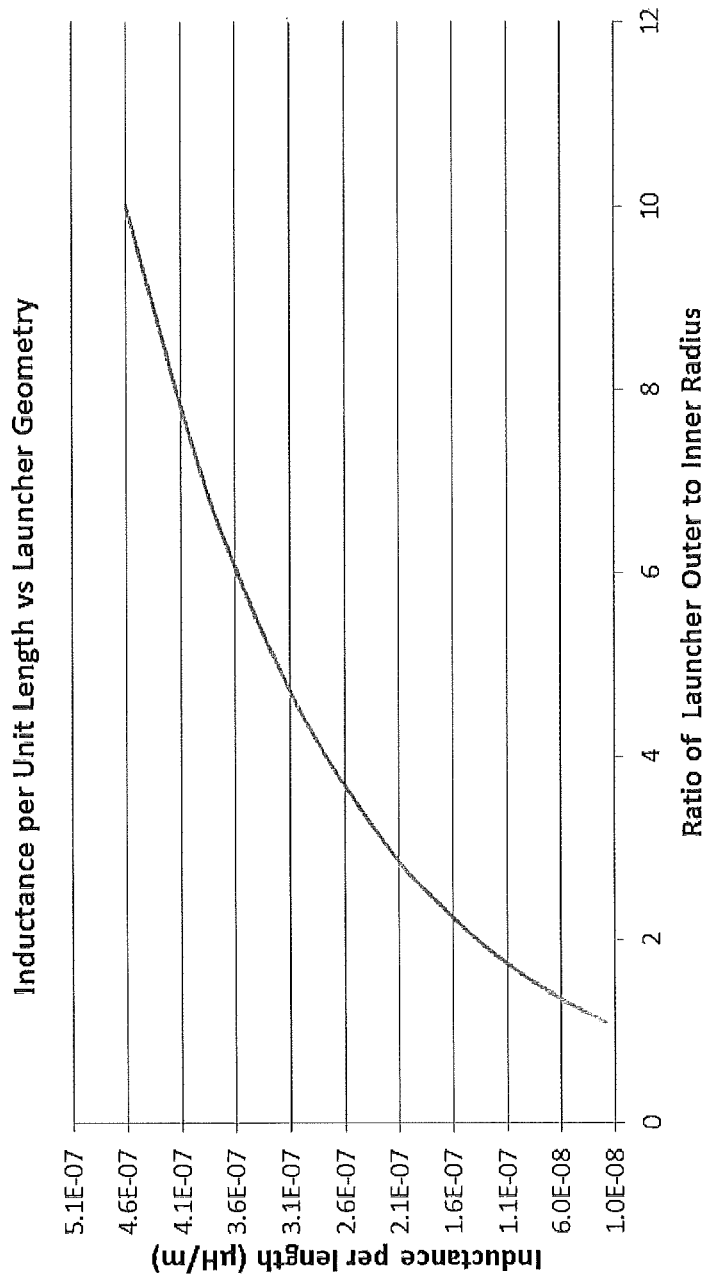
Figure 7:
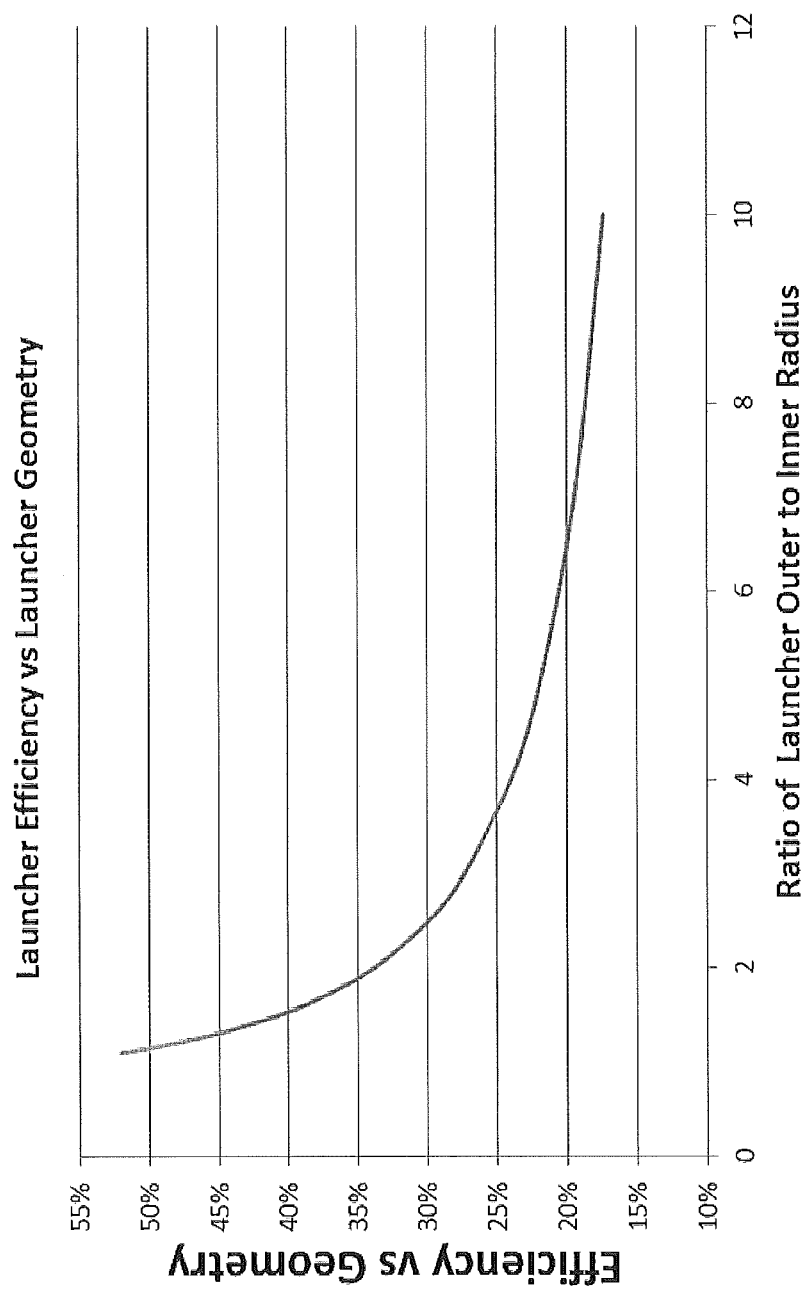
Figure 8A:
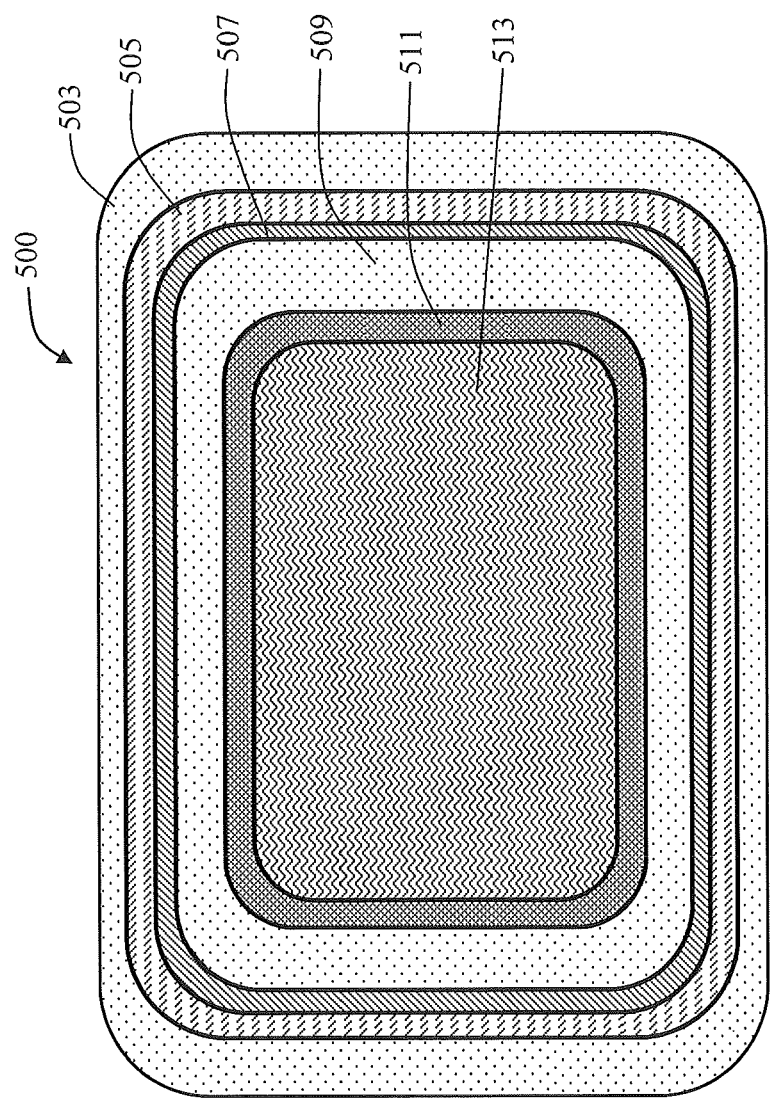
Figure 9:
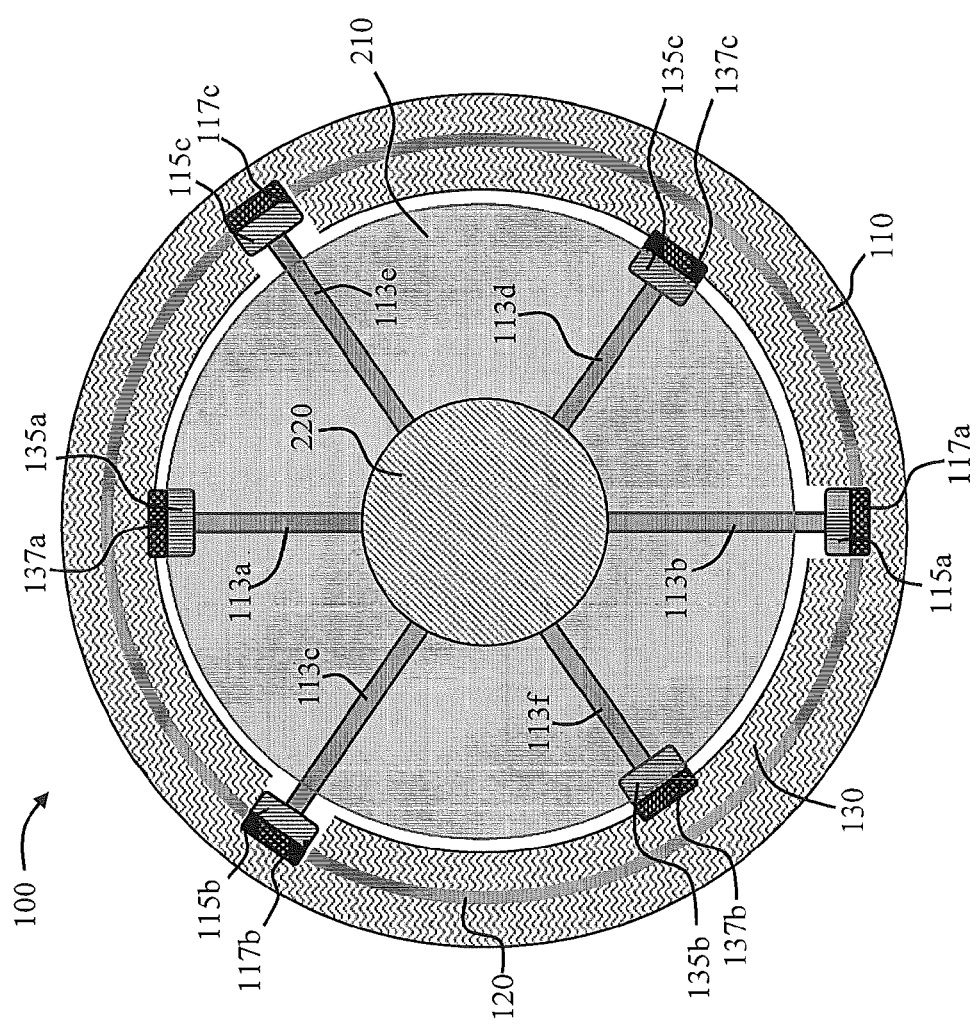
Figure 10:
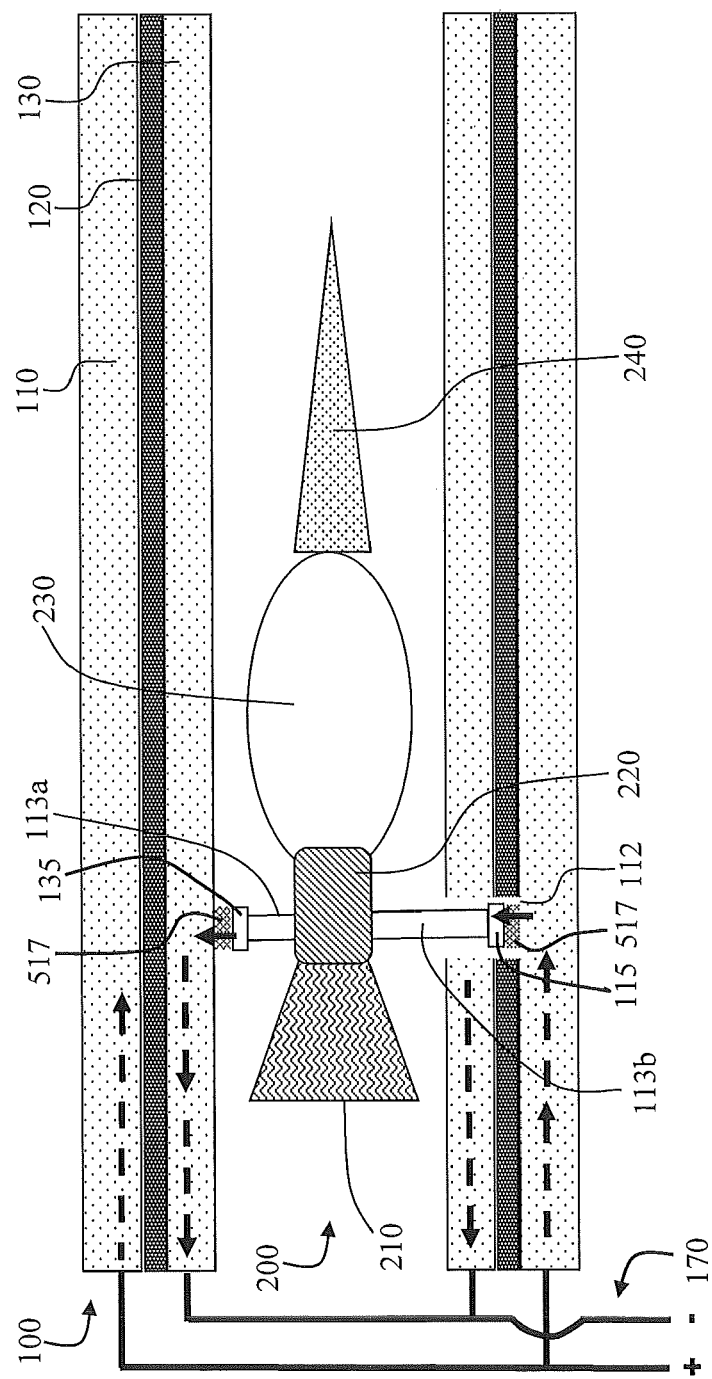
Figure 11:
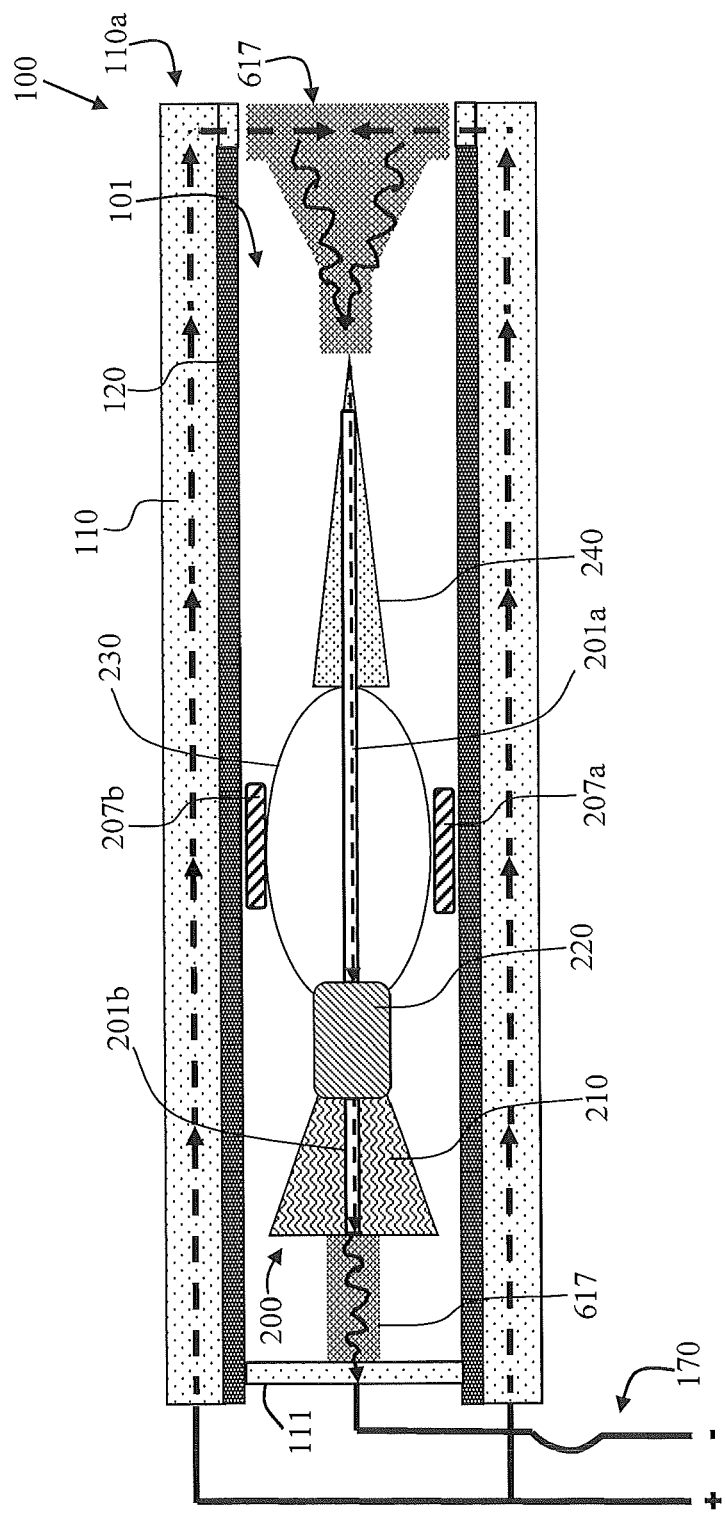
Figure 12:
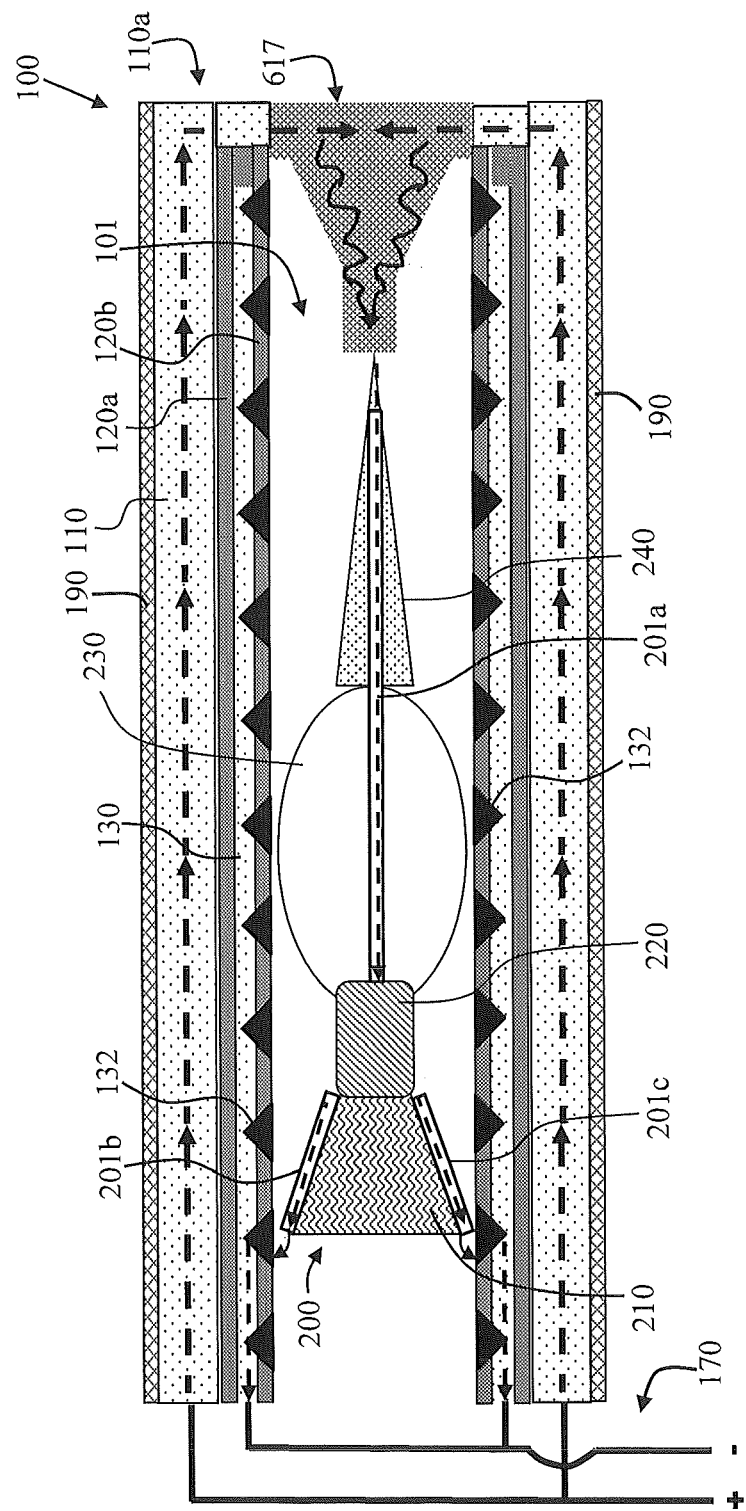
Figure 13:
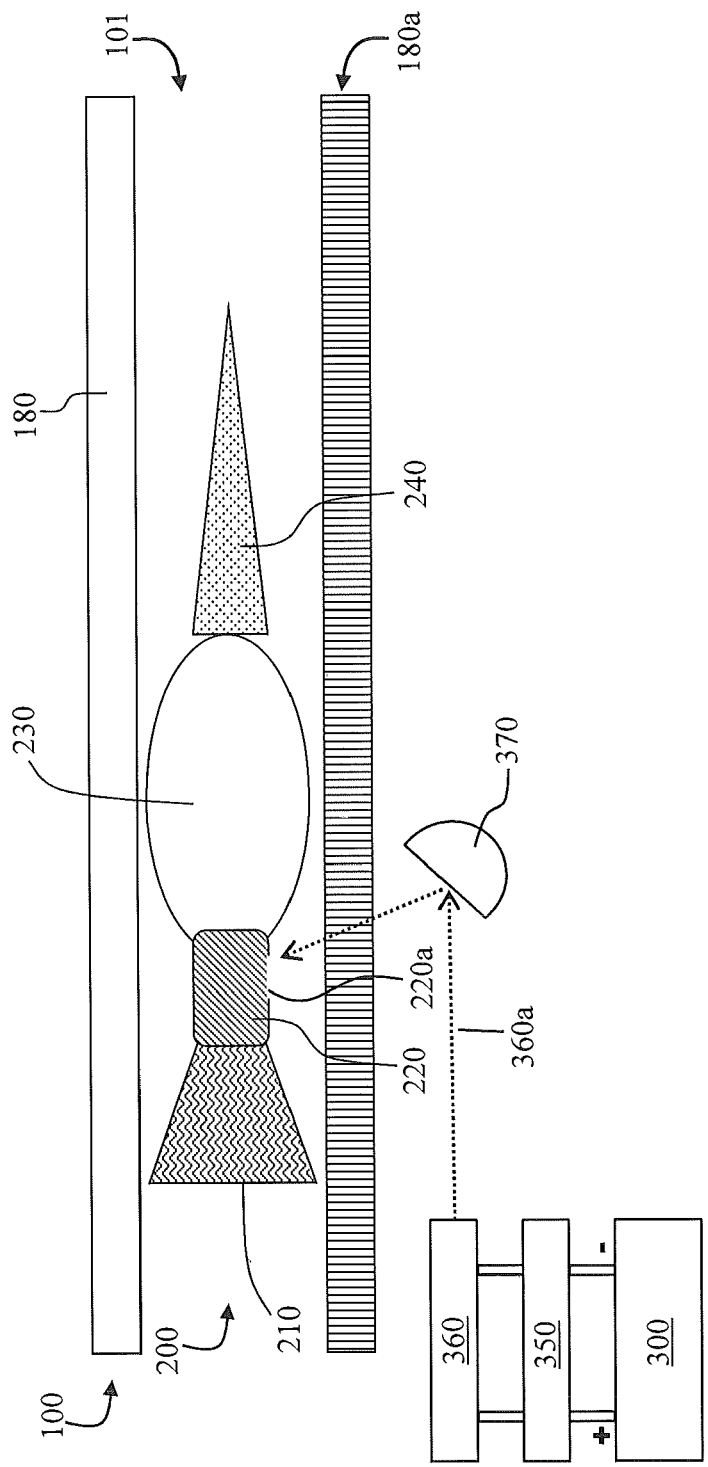
Figure 14:
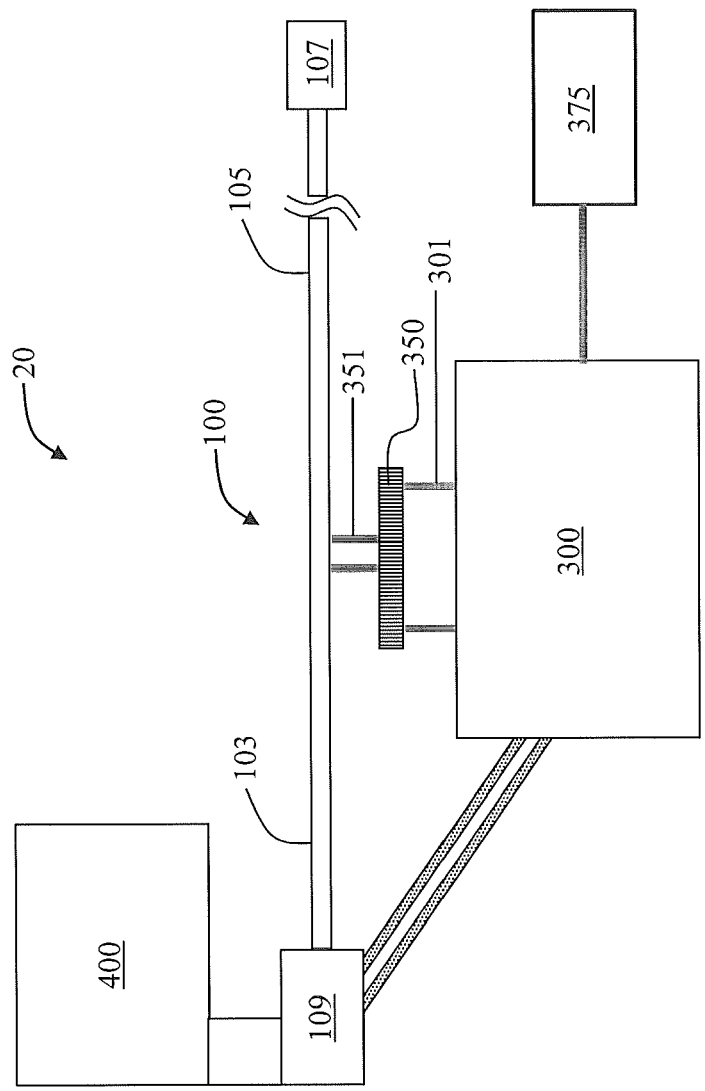
Figure 15:
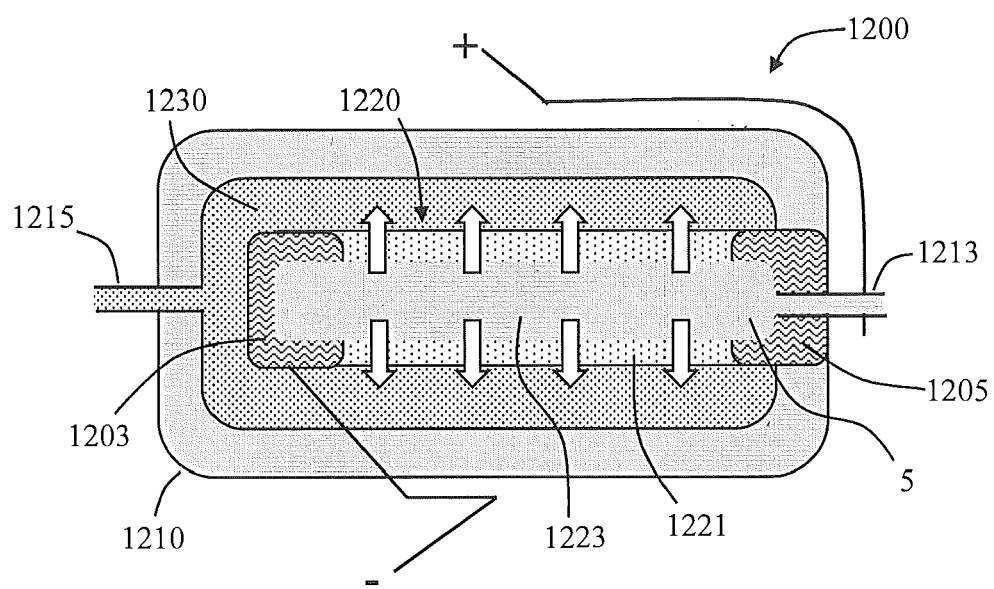
Figure 16:
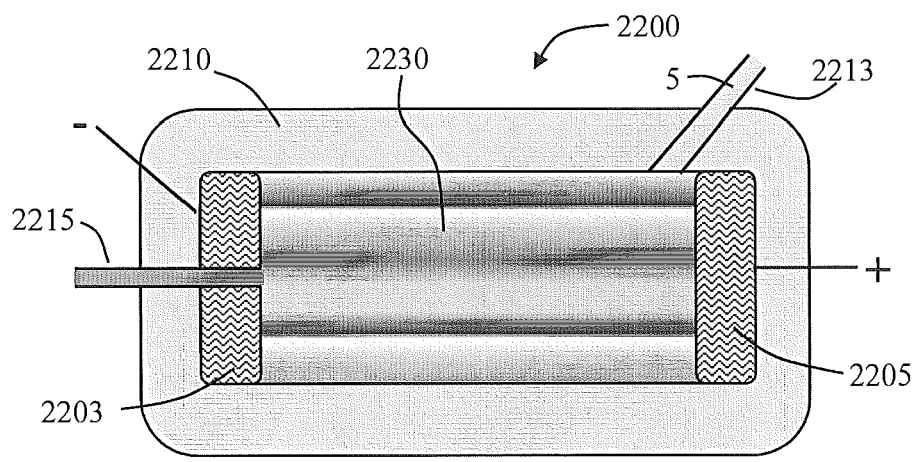
Figure 17:
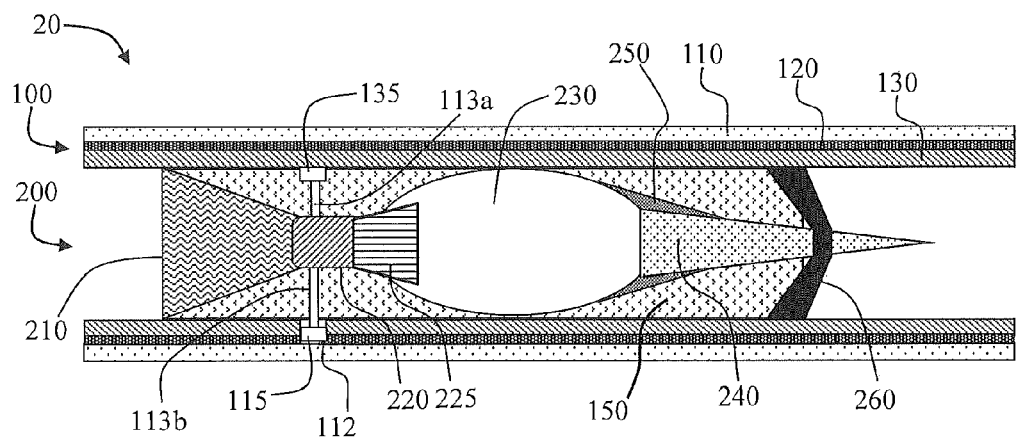
Figure 18:
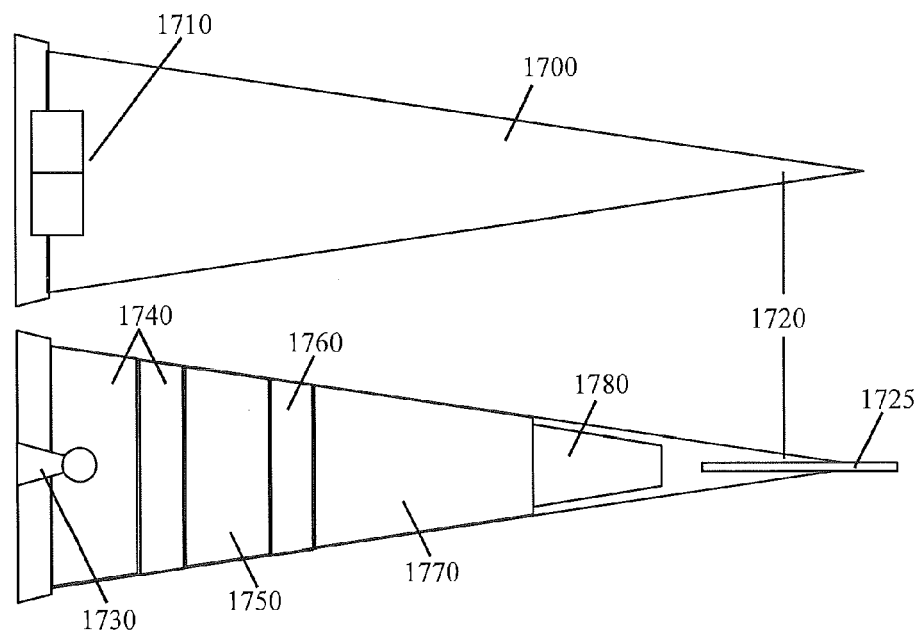
Figure 19:
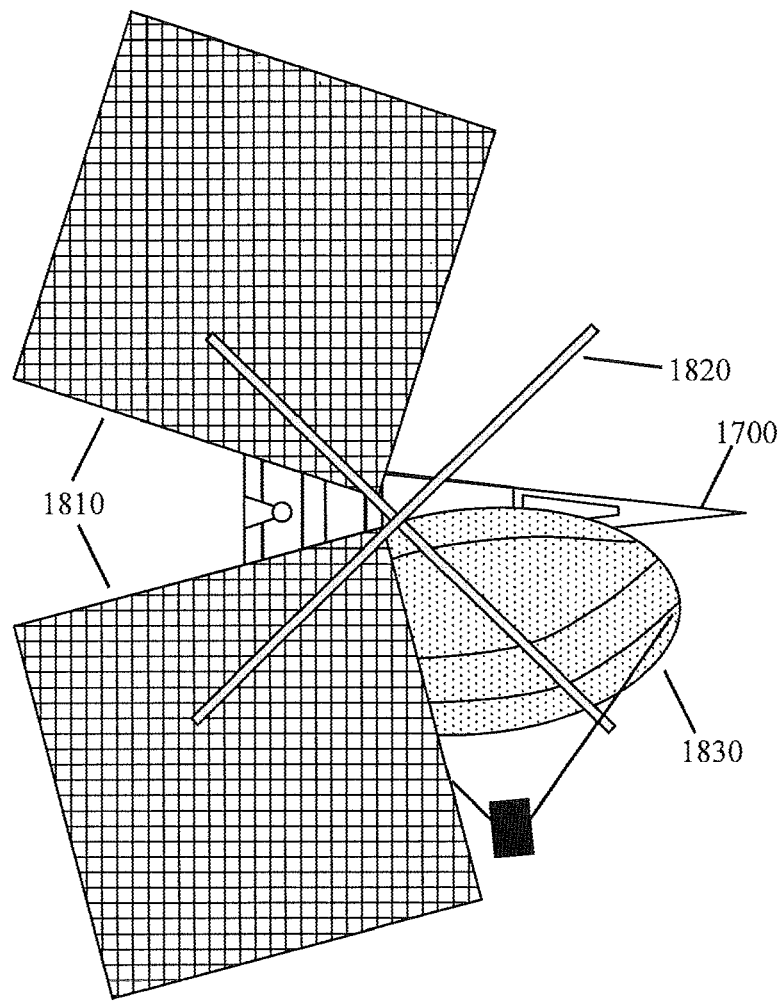

Having thus described the disclosure in the foregoing general terms, reference will now be made to the accompanying drawings, which are not necessarily drawn to scale, and wherein:

FIG. 1 is a side sectional view of a launch system according to an exemplary embodiment of the present disclosure wherein a launch vehicle is positioned within an electrically conductive launch tube;

FIG. 2 is a schematic of a launch tube according to an exemplary embodiment of the present disclosure in comparison with a launch tube from a typical prior art railgun;

FIG. 3 is a graph showing electrical to kinetic energy conversion efficiency as a function of launcher magnetic field intensity for a launcher according to an exemplary embodiment of the present disclosure and a known art electromagnetic launcher;

FIG. 4 is a graph showing electrical to kinetic energy conversion efficiency as a function of launcher magnetic field intensity for a launcher according to an exemplary embodiment of the present disclosure across a preferred range of minimized magnetic field strength;

FIG. 5 is a graph showing efficiency as a function of inductance for a launcher according to an exemplary embodiment of the present disclosure and a known art electromagnetic launcher;

FIG. 6 is a graph showing inductance per unit length versus launcher geometry for a launcher according to an exemplary embodiment of the present disclosure;

FIG. 7 is a graph showing efficiency versus launcher geometry for a launcher according to an exemplary embodiment of the present disclosure;

FIG. 8a illustrates sliding contact according to an exemplary embodiment of the present disclosure;

FIG. 8b illustrates current transfer from the launch tube conductor through a plasma layer into the sliding contact according to an exemplary embodiment of the present disclosure;

FIG. 9 is a rear view of a launch system according to an exemplary embodiment of the present disclosure wherein a launch vehicle is positioned within an electrically conductive launch tube;

FIG. 10 is a side sectional view of a launch system according to an exemplary embodiment of the present disclosure wherein a launch vehicle is positioned within a launch tube formed of concentric electrically conductive tubes separated by a coaxial insulator tube;

FIG. 11 is a side sectional view of a launch system according to an exemplary embodiment of the present disclosure wherein a launch vehicle is positioned within a launch tube formed of an electrically conductive tube and an insulator tube, and wherein the launch tube is configured to provide passage of electrical current through an open bore of the launch tube via a plasma arc;

FIG. 12 is a side sectional view of a launch system according to an exemplary embodiment of the present disclosure wherein a launch vehicle is positioned within a launch tube formed of two electrically conductive tubes and two insulator tubes, and wherein the launch tube is configured to provide passage of electrical current through an open bore of the launch tube via a plasma arc and back into one of the electrically conductive tubes;

FIG. 13 is a side sectional view of a launch system according to an exemplary embodiment of the present disclosure wherein a launch vehicle is positioned within a launch tube that includes a passage for entry of a power beam as the source of electrical energy for the electrical heater of the launcher;

FIG. 14 is a schematic of a launch system according to exemplary embodiment of the present disclosure showing a launch tube in connection with an electrical energy source;

FIG. 15 is a cross-section of an electrical heater according to an exemplary embodiment of the present disclosure comprising elements useful for resistive heating;

FIG. 16 is a cross-section of an electrical heater according to an exemplary embodiment of the present disclosure comprising elements useful for swirl stabilized vortex arc heating;

FIG. 17 is a side view of a launch system according to an exemplary embodiment of the present disclosure wherein a launch vehicle is positioned within an electrically conductive launch tube that includes differential pressurization;

FIG. 18 is an illustration of a payload component of a launch vehicle according to an exemplary embodiment of the present disclosure showing an external view of the payload component and an internal view of the payload component revealing various elements of the exemplified embodiment, the payload component being in an atmospheric transit configuration; and FIG. 19 is the payload component of a launch vehicle according to an exemplary embodiment of the present disclosure, wherein the payload component is in an in-orbit or other deployed configuration in the vacuum of space outside of any significant atmosphere.

DETAILED DESCRIPTION OF THE DISCLOSED EMBODIMENTS

The present disclosure will now be described more fully hereinafter with reference to exemplary embodiments thereof. These exemplary embodiments are described so that this disclosure will be thorough and complete, and will fully convey the scope of the disclosure to those skilled in the art. Indeed, the present disclosure may be embodied in many different forms and should not be construed as limited to the embodiments set forth herein; rather, these embodiments are provided so that this disclosure will satisfy applicable legal requirements. As used in the specification, and in the appended claims, the singular forms "a", "an", "the", include plural referents unless the context clearly dictates otherwise.

The present disclosure provides means for rapid acceleration of a projectile. In a particular embodiment, the projectile can comprise all or part of a space launcher. As such, the disclosure may focus on this embodiment for simplicity in describing the several features of the present subject matter. Nevertheless, the disclosed subject matter is not intended to be limited to space launch or to further specific embodiments discussed herein. Rather, any disclosure in relation to a specific embodiment is intended to be exemplary of the subject matter so as to provide a description sufficient to extend the exemplary discussion to further embodiments.

The present disclosure provides a launch system, one or more apparatuses that can be utilized in the launch system, and one or more methods of launching an object, in particular to a high velocity at rapid but not excessive acceleration. In certain embodiments, these and further aspects of the disclosure can be achieved though use of an electroantimagnetic ("EAM") launcher that utilizes low atomic weight elements as a propulsion propellant.

Electromagnetic ("EM") launchers have been under active development by the U.S. government and other entities for approximately 30 years. EM launchers (e.g., railguns) rely upon induced magnetic fields created by electrical current flowing down two parallel rails and through a launch apparatus that is accelerated by the electromagnetic effect. Similarly, augmented EM launchers can utilize a driving current that is channeled through additional pairs of parallel conductors that are arranged so as to increase or augment the magnetic field experienced by the launch apparatus. Research to date, however, indicates that EM launchers suffer from severe problems that prevent them from achieving the conditions necessary for space launch. At high velocities, magnetic effects absorb enormous power and energy. This can effectively destroy the ability to achieve stable electrical conduction between a moving launch package and stationary feed conductors. Rather than using electrical energy to create magnetic forces to propel the launch package, the EAM launcher according to the present disclosure can substantially minimize induced magnetic forces and thus likewise minimize the energy drain and distorting effects thereof. More particularly, propulsion according to the present disclosure is provided by expansion of an electrically heated gas rather than due to magnetic force.

A launch system according to the present disclosure can comprise a number of components that may independently provide useful improvements over known technologies as well as in a number of combinations of the disclosed components. For example, in some embodiments, a launch system according to the present disclosure can comprise a launch tube in electrical connection with an electrical energy source so as to provide electrical energy to a launcher that may comprise one or more of a propellant source, an electrical heater for heating the propellant from the propellant source, sliding contacts in electrical contact with the electrical heater and in electrical contact with the launch tube, an expansion nozzle in fluid communication with the electrical heater and adapted for discharge of one or more heated propellant or a component thereof, and a payload in mechanical connection with one or more of the further components of the launcher. In some embodiments, a launch system according to the present disclosure can be configured to provide power to an electric rocket from a stationary power supply via one or more conductors in an evacuated tube. The system can utilize a relatively lightweight engine with a high thrust to weight ratio that requires only short thrust durations to achieve launch.

A side view of components of a launch system 20 according to one embodiment of the present disclosure is shown in FIG. 1. As illustrated therein, a launcher 200 is positioned within a launch tube 100. The launch tube 100 can comprise a plurality of concentric, electrically conductive tubes that can be separated by one or more insulating layers. Alternatively, the launch tube can comprise a single, multi-layer tube comprising a plurality of conductive layers separated by one or more insulating layers. As shown in the embodiment of FIG. 1, the launch tube 100 can comprise an outer conductive tube 110 spaced apart from an inner conductive tube 130 and separated by an insulator 120. The outer conductive tube 110 and the inner conductive tuber 130 can be formed of any suitable, conductive material, such as a metal or metal alloy. In some embodiments, the conductive tube walls can comprise layers of two or more different materials. As exemplary embodiments, one or both of the inner conductive tube and the outer conductive tube can comprise steel, aluminum, or an aluminum alloy. In preferred embodiments, the innermost layer of one or both of the inner conductive tube and the outer conductive tube can comprise a high temperature wear resistant conductive material such as tungsten, rhenium, or hardened copper. As such, one or both of the inner and outer conductive tubes can comprise an outer layer formed of steel or aluminum and an inner layer formed of the high temperature wear resistant conductive material (wherein inner references proximity to the interior of the tube and outer references proximity to the exterior of the tube). In some embodiments, an interlayer material can be formed between the predominant outer layer and the inner layer. For example, an interlayer can comprise copper or molybdenum. The size of the bore through which the launcher is accelerated can vary based upon the size of the payload being launched. In some embodiments, the launch tube can have a bore size of at least 0.5 m, at least 1 m, at least 2 m, at least 5 m, or at least 10 m. In certain embodiments, bore size can be about 1 m to about 1 m.

The insulator 120 can be present in an annular space between the inner conductive tube 130 and the outer conductive tube 110 and can comprise any material effective to substantially prevent flow of electrical current between the two conductive tubes. In preferred embodiments, the thickness of the insulator 120 and the annular space between the two conductive tubes can be minimized. Such minimization can be useful to minimize the volume and intensity of a magnetic field formed by the electric current flow through the conductive tubes. For example, in various embodiments, electric current passes through one of the inner and outer conductive tubes, through an electrical heater, as further discussed below, and back along the other of the inner and outer conductive tubes. The thickness of the insulator and/or the annular space between the outer conductive tube and the inner conductive tube can be about 0.5 cm to about 30 cm, about 1 cm to about 20 cm, about 1.5 cm to about 15 cm, or about 2 cm to about 10 cm.

The advantages of the present EAM launcher are evident in comparison to railgun technology. The geometry of the launch tube in particular for the present EAM launcher can significantly reduce or eliminate the adverse effects of large magnetic fields. The key concept driving the known art of EM launchers, such as railguns, has been to maximize the magnetic forces pushing the projectile. In attempts to achieve the greatest launch force, very large magnetic fields are used with EM launchers. This involves a significantly large electrical current requirement and results excessive mechanical pressures from the intense magnetic fields. It also results in very large resistive losses and arc losses. As an example, a typical railgun designed to launch a one ton payload uses 10 million to about 50 million amps of electrical current and magnetic fields of about 10 to about 25 Tesla, with resulting pressures of about 15,000 to about 100,000 PSI. Losses in the system lead to a railgun having roughly 10% efficiency when evaluated at orbital velocities, and this only if one can effectively maintain the structural integrity of the plasma armature. That feat has heretofore never been accomplished, despite extensive government research and development investments. The highest recorded, repeatable velocity ever achieved with railgun technology is about 6,000 meters per second, and the highest efficiencies of such high velocity launches was only a few percent.

The amount of electrical current required to launch a vehicle through a launch tube according to the methods of the present disclosure can vary and can be scaled in relation to the launched mass. As an exemplary embodiment, launch of a one ton payload utilizing an EAM launcher according to the present disclosure can require application of an electrical current of about 0.2 mega-amps to about 5 mega-amps—i.e., a 10 to 200 fold reduction in comparison to typical EM launcher technology if used for launching the same mass. This is particularly relevant since losses and pressures scale as the square of applied electrical current and thus can be reduced 100 fold to 40,000 fold. With that basis, an EAM launcher according to embodiments of the present disclosure can provide dramatic increases in efficiency as compared to EM launcher technology. In some embodiments, launch systems and methods according to the present disclosure can utilize electrical currents in the range of about 0.2 mega-amps to about 200 mega-amps. For more practically sized payloads, current can be up to about 100 mega-amps or up to about 50 mega amps. Specific electrical currents required for launch of a desired mass can be identified within this range in light of the further disclosure provided herein.

Electrical current requirements for prior art railguns are known to scale up as the square root of launched mass in order to maintain accelerations since this is necessary to attain the same velocity. Systems and methods according to the present disclosure, however are not limited by any requirement to scale up drive currents to maintain accelerations. To keep structural reinforcement mass fractions constant for the launched mass, the acceleration must be reduced as the payload grows larger. Generally, the acceleration would be desired to be reduced proportionately to the length of the launched mass, or generally proportionately to the cube root of the launched mass. These effects are shown in the following table. It can be seen that the advantages of this disclosure in reducing drive current grow ever larger as the launched mass is increased. This is especially important for large masses as may be envisioned for human launch systems. In such systems, because of the need for low accelerations for human passengers, the drive currents will tend toward the lower end of the range exemplified. The following table specifically provides exemplary embodiments illustrating changes in required drive current related to changes in launcher mass. As can be seen from the table, although the required drive current according to the present disclosure increases with launcher mass, the relative drive current is surprisingly low in comparison to the current that would be expected to be required to launch the same mass using a prior art railgun. Due to the relatively large scale of a launcher configured for high mass payloads (e.g., a 10 meter bore size for a 1,000,000 kg launcher using 50 mega-amps of current), the large currents do not present limitations to the presently disclosed systems and methods.

TABLE

| Launcher Mass (kg) | Prior Art Railgun Current (mega-amps) | Current for Present Systems and Methods (mega-amps) |
| --- | --- | --- |
| 1,000 | 20-50 | 0.2-5 |
| 4,000 | 40-100 | 0.3-8 |
| 16,000 | 80-200 | 0.5-13 |
| 64,000 | 160-400 | 0.8-20 |
| 256,000 | 320-800 | 1.3-32 |
| 1,024,000 | 640-1,600 | 2-50 |

The advantages of the presently disclosed EAM launcher are further evident in the various appended figures. For example, FIG. 2 shows a side-by-side comparison of an exemplary embodiment of a launch tube for an EAM launcher and a launch tube for a typical, known EM railgun. Distinct differences are readily apparent. For example, in the EAM launcher, the conductors (110 and 130) can completely encircle the launch tube whereas, in the EM launcher, the conductors (310a and 310b) form significantly less than 50% of the surface area of the launch tube internal wall. Rather, insulators (320a and 320b) form the significant majority of the inner launch tube wall surface of the EM launcher. The effect of the very large space separating the electrical conductors in the EM launch tube is a large volume, highly intense magnetic field, and this is desired in typical railguns to drive the projectile. On the contrary, in the tube of an EAM launcher according to the present disclosure, the concentric conductors (110 and 130) are separated by only a small annular space insulator 120. As such, the total volume of annular space between the conductors is minimized, and the intensity of the induced magnetic field is reduced. The significant difference in magnetic field strength is illustrated in FIG. 3.

The electrical to kinetic energy conversion efficiency of a high velocity launcher can be a function of at least in part, the strength of the magnetic field within the launch tube. Typical, known EM launchers require magnetic fields in the range of 10 Tesla to greater than 20 Tesla. As illustrated in FIG. 3, the electrical to kinetic energy conversion efficiency of the EM launcher increases as the magnetic field strength increases; however, the highest efficiency (at a field strength of about 25 Tesla is only in the range of about 12% (although efficiencies at velocities greater than about 6,000 m/s can be significantly reduced, such as to the range of about 0.02% to about 1%). The completely opposite effect is seen with the EAM launcher of the present disclosure. Specifically, the efficiency of the EAM launcher drops dramatically as the magnetic force increases. The present EAM launcher, however, surprisingly can achieve an electrical to kinetic energy conversion efficiency of greater than 51% in various embodiments when magnetic field strength is substantially 0 Tesla. Accordingly, in certain embodiments of the present disclosure, the EAM launcher, and particularly the launch tube, can be adapted to transmit necessary ranges of electrical current while generating or inducing a magnetic field at a strength of less than about 1.25 Tesla, less than about 1 Tesla, less than about 0.5 Tesla, less than about 0.25 Tesla, or less than about 0.2 Tesla. In some embodiment, magnetic field can be limited to a strength of about 0.2 Tesla to about 1.2 Tesla. This is graphically illustrated in FIG. 4. In some embodiments, the magnetic field strength can be sufficiently minimized through appropriate minimization of the insulator volume in the annular space between the concentric electrically conductive tubes. In other embodiments, however, further means for limiting, reducing, or eliminating any magnetic field can be utilized.

Efficiency for an EAM launcher according to the present disclosure can be significantly improved over known art EM launcher technology in relation to further properties. For example, FIG. 5 illustrates the advantages of the presently disclosed EAM launcher over typical, prior art EM launchers in relation to inductance. As seen in FIG. 5, a typical EM launcher seeks to increase inductance per unit length to increase efficiency. On the other hand, efficiency for an EAM launcher according to the present disclosure can be maximized when inductance is minimized.

In order to minimize inductance according to certain embodiments of the present disclosure, it can be desirable to provide the launch tube for the EAM launcher with a desired geometry. As shown in FIG. 6, inductance per unit length can vary based upon the ratio of the outer radius to the inner radius for the launch tube (i.e., the ratio of the radius of the outer tube to the radius of the inner tube). Inductance can decrease as the ratio decreases. Thus, it can be desirable to provide the launch tube with a low ratio—i.e., a minimized total thickness for any space existing between the walls of the conductive launch tube. In certain embodiments, the ratio of outer to inner radius for a launch tube according to the present disclosure can be less than 2, less than about 1.5, less than about 1.25, less than about 1.15 or less than about 1.1. In further embodiments, the ratio of outer to inner radius can be about 1.4 to about 10, about 1.5 to about 7.5, about 1.6 to about 5, about 1.65 to about 4, or about 1.7 to about 2.5.

Launcher geometry also can affect efficiency of an EAM launcher according to the present disclosure. As seen in FIG. 7, the efficiency of an EAM launcher can increase as the ratio of the outer to inner radius for the launch tube decreases. Thus, it further can be desirable to achieve the ratios already noted above. Specifically, it can be desirable to approach a ratio that is as close to 1 as possible (limited only by the necessary thickness of the conductors for carrying current and the thickness of insulators present to prevent high voltage breakdown between the conductive tubes).

The walls of the outer and inner conductive tubes can have one or more slotted tracks of varying geometries that are adapted for receiving one or more sliding contacts. The cross-section of FIG. 1 passes through a slotted track 112 in the inner conductive tube 130 and the insulator 120 (with a portion of the inner tube and insulator cut away to reveal the sliding contact in the slotted track). The slotted track 112 provides for an electrical connection of the outer conductive tube 110 and an outer sliding contact 115. An inner sliding contact 135 is also illustrated in electrical connection with the inner conductive tube 130. The slotted tracks can be effective to facilitate proper contact between the tubes and the sliding contacts, to prevent or substantially reduce arcing between the tube conductors, and also serve to align the launcher 200 and substantially prevent rotating thereof within the launch tube 100. Aligning arms 113a and 113b can be in physical contact with the sliding contacts 115 and 135, respectively, and also be in physical contact with the electrical heater. The aligning arms preferably comprise a high strength, rigid, conductive material, such as steel, aluminum, or another metal or metal alloy that can include an insulative layer, if desired.

The sliding contacts can be formed of a suitable conductive material and can take on particular structures, as further discussed below. In some embodiments, the conductive sliding contacts can be positioned so as to define a mechanical sliding contact with the tube walls while exhibiting only a low voltage drop. In some embodiments, the contacts may not be in an actual physical engagement with the tube walls in use. In some embodiments, the conductive sliding contacts can define an arcing sliding contact (e.g., a plasma brush) with the conductive tube walls with only a minimal voltage drop. The arc may be contained via mechanical containment, such as using a sliding insulating perimeter. In other embodiments, the arc may be contained via magnetic forces, which can be generated by the current transferring from the contact. In particular, the contacts may define a current loop adapted to generate the magnetic forces. In some embodiments, the magnetic forces can be generated by a self contained power source or object that may be present on the launcher. As an example, the magnetic forces can be generated by a magnet, which may be a superconducting magnet.

In particular embodiments, the sliding contact pads may be configured to function as plasma brushes. Beneficially, any magnetic fields present in the region of the plasma brushes can be substantially close to zero. In some embodiments, the magnetic pressure in or around the plasma brushes can be in the range of 1-10 psi. As such, in some embodiments, low current windings or permanent magnets can be useful to contain the plasma. Further, the plasma brushes can be configured such that known null field plasma contact physics can be applied. In some embodiments, sliding contact pads functioning as plasma brushes according to the present disclosure can be configured to provide a velocity at 0.1 kA/cm$^2$ of at least 3,000 m/s, at least 4,000 m/s, at least 6,000 m/s, at least 8,000 m/s, at least 10,000 m/s, or at least 12,000 m/s. An illustration of an embodiment of a plasma brush current collector design is illustrated in FIG. 8*b*, which is discussed below.

In addition to the sliding contacts, additional elements may be included for aiding movement of the launch vehicle through the launch tube. For example, in some embodiments the vehicle can include magnetic bearings and/or gas bearings that can aid in centering the vehicle within the tube and substantially prevent physical contact therebetween. As such, the vehicle can be characterized as being non-contacting in relation to the launch tube with the exception of the sliding contacts which, for example, can encompass plasma brush embodiments or the like.

In some embodiments, the sliding contacts and/or the slotted track insulators can be cooled. Such cooling can be, for example, via use of a transpiring fluid, which optionally can be a conductive material, such as a low melting metal having a low ionization potential (e.g., cesium, aluminum, lithium, or analogous low melting, soft metal with a low ionization potential). In certain embodiments, cooling can be via conductive and/or convective means, which can include the use of one or more materials configured to melt and/or vaporize during use while still substantially avoiding dispersal of materials rearward of the moving launch vehicle and thus avoiding undesirable arc formation. Similarly, an insulating perimeter of the contacts and/or the alignment arms can be cooled, such as via transpiration cooling. For example, the transpiration fluid can be an insulating material such as hydrogen, sulfur hexafluoride, or a like liquid or gas.

In certain embodiments, sliding contacts according to the present disclosure can be adapted to exhibit one or more state transitions. For example, the sliding contacts initially can be configured to be substantially solid and may be in contact with the solid tube wall or separated therefrom by an electrically conductive spacing. The sliding contact, or a portion thereof (e.g., a contact pad) can be configured to transition to a liquid metal melt. This can occur, for example, when the launch vehicle reaches a velocity of about 1000 to about 2000 m/sec. In some embodiments, the sliding contact may be in physical contact with the tube wall initially and can transition to an arcing contact during use (e.g., establishing a plasma separation). Such transition can occur, in certain embodiments, at a velocity of about 1500 to about 3000 m/sec. A majority of electrical current transfer to the sliding contact may occur during the arcing phase. The sliding contacts can include mechanical, fluid dynamic, arc seeding, and electromagnetic features to minimize the arc voltage and thus the energy loss at the contact. In some embodiments, arc voltage can be about 50 to about 500 V. The arc preferably is stably positioned at the contact and does not substantially move outside of the desired contact region.

An exemplary sliding contact pad is shown in FIG. 8*a*. The sliding contact pad 500 includes an outer rim 503, which optionally can be cooled, such as via transpiration cooling. For example, the outer rim can be porous, and a coolant, such as hydrogen or sulfur hexafluoride can be frozen into pores of the outer rim. In one embodiment, porous material with liquid $SF_6$ can be cooled with liquid hydrogen to freeze the $SF_6$ in the pores. Alternatively, the liquid $SF_6$ can be sealed under pressure and released as the surface melts. Moving inward in FIG. 8*a*, the sliding contact 500 further includes a magnetic rim 505, an ablative shield 507, an inner rim 509 (which optionally may be cooled and, for example, may comprise the same cooling material described above in relation to the outer rim 503 or may comprise a different material), an ablative rim 511, and the conductor 513. In some embodiments, the conductor 513 optionally can be cooled. Preferably, coolants for the conductor 513 are materials that exhibit low ionization potentials and that will not inhibit the function of a plasma brush configuration during volatilization thereof. Preferably, cooling of the conductor 513 is carried out such that discharge of materials from the conductive plasma brush region in the area of the conductor 513 into the regions (511, 509, 507, 505, and 503) exterior thereto will not counteract the plasma quenching properties of any materials released by any of the respective rim regions.

The sliding contact can be in a non-physical contact with the conductor tube, such as through a plasma brush embodiment, as illustrated in FIG. 8*b*, which shows a partial section of a portion of a conductor tube 530 and a sliding contact 515 with a contact pad 500 configured to establish a plasma arc contact 517 (i.e., a plasma brush) with the conductor tube. As seen therein, as the sliding contact 515 moves along the conductor tube 530, the contact pad 500 is not in direct physical contact with the conductor tube, but the passage of electrical current (illustrated by the curved arrows) from the tube through the contact pad to the sliding contact establishes a plasma arc 517 that physically separates the contact pad and the conductor tube. As noted above, the magnetic pressure in or around the plasma arc can be sufficiently low to provide for containment of the plasma field with known means.

A contact pad, such as illustrated in FIG. 8*a* can be characterized as a plasma brush current collector that utilizes low field, low density plasma conduction. The collector can include, for example, elements that seed the plasma, elements that cool the collector surfaces, elements that quench the plasma bleed that may form behind the moving brush, elements that quench the plasma outflow, and elements that prevent secondary arcing behind the engine of the launcher.

The outer conductive tube and the inner conductive tube can define one current outbound path in series with one return current path. In some embodiments, there can be multiple current outbound paths in parallel. If desired, all outbound paths can be in series with multiple return current paths. The launcher inductance can be lowered proportionately to the number of parallel current paths. Beneficially, the lower inductance can lower the magnetic field energy and thus any undesired effects of the magnetic field.

The arrangement of the launch vehicle 200 and the launch tube 100 according to some embodiments is further illustrated in FIG. 9, which shows a rear end view thereof. Again, the launch tube 100 includes an outer conductive tube 110 and in inner conductive tube 130 separated by an insulator 120. Sliding contacts (135a, 135b, and 135c) are in electrical connection with the inner wall of the inner conductive tube 130, and sliding contacts (115a, 115b, and 115c) are in electrical connection with the inner wall of the outer conductive tube 110. In the illustrated embodiment, outer sliding contact 115a, 115b, and 115c are in electrical connection with outer conductive strips 117a, 117b, and 117c, and inner sliding contacts 135a, 135b, and 135c are in electrical connection with inner conductive strips 137a, 137b, and 137c. The respective conductive strips can extend substantially along the entire length of the launch tube or can extend along only a portion of the launch tube. The sliding contacts interconnect with the electrical heater 220 via aligning arms (113a-113f). The exhaust nozzle 210 is shown partially transparent to reveal the above-described components.

A launch system according to the present disclosure can take on a variety of embodiments that may incorporate a variety of the individual elements described herein in a variety of different conformations. As such, the present disclosure is to be read as indicating that the individual components can be combined in any useful combination to achieve a launch system encompassed by the present disclosure.

One embodiment of a launch system according to the disclosure is shown in FIG. 10. As seen therein, a launcher 200 is positioned within a launch tube 100. The launch tube 100 comprises an outer conductive tube 110 spaced apart from an inner conductive tube 130 and separated by an insulator 120. In the illustrated embodiments, a slotted track 112 is formed in the inner conductive tube 130 and the insulator 120. The launcher 200 comprises a payload 240, a propellant tank 230, and electrical heater 220, and an expansion nozzle 210. The launcher 200 is aligned within the launch tube 100 via a plurality of aligning arms 113a and 113b. While only two aligning arms are illustrated in FIG. 10, it is understood that more than two aligning arms may be present. The aligning arms 113a and 113b are attached at a first end to the launcher 200, for example to the electrical heater 220, and include sliding contacts 115 and 135 at opposing ends thereof. The sliding contact 135 on aligning arm 113a is configured to provide electrical interaction with the inner conductive tube 130. The sliding contact 115 on aligning arm 113b is configured to provide electrical interaction with the outer conductive tube 110 (e.g., within the slotted track 112). In each case, the sliding contacts 115 and 135 are configured to provide a plasma arc contact 517 with the respective conductive tubes 110 and 130. In use, as shown in FIG. 10, electrical energy passes from an electrical energy source (see element 300 in FIG. 13) via electrical lines 170. As illustrated, electrical energy passes from the electrical lines 170 to the outer conductive tube 110, passes to the sliding contact 115 via the plasma arc contact 517 and through the aligning arm 113b to the electrical heater 220. The electrical path is completed by passage from the electrical heater 220 through the aligning arm 113a and the sliding contact 135 to the inner conductive tube 130 via the plasma arc contact 517. Propellant from the propellant tank 230 is heated in the electrical heater 220 and expanded through the nozzle 210 to accelerate the launcher 200 through the launch tube 100. In such embodiments, propulsion can be characterized as proceeding via electric rocket propulsion powered by plasma-mediated electrical current conduction. Specifically, plasma-mediated conduction occurs at the plasma arc contact 517 between the conductive tubes 110 and 130 and the sliding contacts 115 and 135.

A further embodiment of a launch system according to the present disclosure is shown in FIG. 11. The system again comprises a launcher 200 positioned within a launch tube 100. In this embodiment, the launcher 200 and launch tube 100 are configured for passage of the electrical drive current through the bore 101 of the launch tube 100 rather than through sliding contacts and aligning arms. The launcher 200 again comprises a payload 240, a propellant tank 230, an electrical heater 220, and an expansion nozzle 210. In addition, the launcher 200 comprises drive conductors 201a and 201b. Optionally, the launcher 200 can include one or more bearings 207a and 207b that are configured to assist in aligning the launcher within the launch tube 100. The launch tube 100, in some embodiments, comprises a single conductive tube 101 and an insulator 120 interior to at least a portion thereof and separating the launcher 200 therefrom. As seen in FIG. 11, the launch tuber 100 further includes a rear conductor 111. In use, according to such embodiments, electrical energy (shown as dashed lines) passes from the electrical lines 170 through the conductive tube 110 to a terminal end 110a thereof and into the bore 101 of the launch tube 100. Although the electrical energy is illustrated as passing to the tube bore 101 at the terminal end 110a of the conductive tube 110, it is understood that passage to the tube bore may occur upstream from the terminal end and/or can occur at a plurality of points along the length of the launch tube. The electrical energy in the bore 101 of the launch tube 100 creates a plasma arc field 617, and the electrical energy passes therethrough to the launcher 200. In some embodiments, the electrical energy passes from the plasma arc field 617 to a forward drive conductor 201a that is attached to or integral with the payload 240 and the propellant tank 230. Although the forward drive conductor 201a is illustrated as a single element, the forward drive conductor can comprise a plurality of elements in electrical contact with one another. The electrical energy passes from the forward drive conductor 201a and into the electrical heater 220 where propellant from the propellant tank 230 is heated and expanded out of the nozzle 210 to accelerate the launcher 200 through the launch tube 100. The electrical energy passes from the electrical heater 220 through a rearward drive conductor 201b (which again may comprise a plurality of elements) that terminates at or near the rearward end of the launcher 200 (e.g., at the rear end of the expansion nozzle 210). The electrical energy leaving the launcher 200 again creates a plasma arc field 617 behind the launcher and passes therethrough to the rear conductor 111, where the electrical energy leaves the launch tube 100 to complete the circuit. Systems according to such embodiments can be advantageous to substantially eliminate problems or damages arising from plasma arc brushes and/or arcing between conductive tubes.

Yet a further embodiment of a system according to the present disclosure is shown in FIG. 12. As seen therein, the system comprises a launcher 200 positioned within a launch tube 100. In this embodiment, the launcher 200 and launch tube 100 are again configured for passage of the electrical drive current through the bore 101 of the launch tube 100, but passage through the bore is limited to the leading portion of the launch tube relative to the launcher. The electrical energy exiting the launcher 200 passes back into the launch tube 100 instead of the bore 101. The launcher 200 again comprises a payload 240, a propellant tank 230, an electrical heater 220, and an expansion nozzle 210. In addition, the launcher 200 comprises drive conductors 201*a*, 201*b*, and 201*c*. The launch tube 100, in some embodiments, comprises two conductive tubes 110 and 130 as well as two insulators 120*a* and 120*b*. Further, the launch tube 100 comprises a plurality of conductor tube switches 132 (e.g., solid state switches) that are configured to receive the electrical energy exiting the launcher 200. In use, according to such embodiments, electrical energy (shown as dashed lines) passes from the electrical lines 170 through the outer conductive tube 110 to a terminal end 110*a* thereof and into the bore 101 of the launch tube 100. The electrical energy in the bore 101 of the launch tube 100 creates a plasma arc field 617, and the electrical energy passes therethrough to the launcher 200. In some embodiments, the electrical energy passes from the plasma arc field 617 to a forward drive conductor 201*a* that is attached to or integral with the payload 240 and the propellant tank 230. Although the forward drive conductor 201*a* is illustrated as a single element, the forward drive conductor can comprise a plurality of elements in electrical contact with one another. The electrical energy passes from the forward drive conductor 201*a* and into the electrical heater 220 where propellant from the propellant tank 230 is heated and then expands out of the nozzle 210 to accelerate the launcher 200 though the launch tube 100. The electrical energy passes from the electrical heater 220 through a plurality of rearward drive conductors 201*b* and 201*c* (although more than two rearward drive conductors may be used) that terminate at or near the rearward end of the launcher 200 (e.g., at the rear end of the expansion nozzle 210). The electrical energy leaving the launcher 200 passes to the nearest conductor tube switch 132, which in turn passes the electrical energy to the inner conductive tube 130 from which it exits the launch tube 100 to complete the circuit. In this manner, the return conduction path in the launch tube can be segmented into a plurality of sections that include the switches, such as solid state switches, arc gap switches, or like element. The return path continuously switches to the segment nearest the trailing end of the launcher as it accelerates down the launch tube. In systems such as shown in FIG. 11 and FIG. 12, field coils (see element 190 in FIG. 12) may be included along all or a portion of the launch tube to reduce or substantially eliminate the magnetic fields produced by the current flow down the bore of the launch tube. For example, field coils 190 may be positioned exterior to the outer conductive tube 110 or may be associated with an insulating layer (e.g., insulator tube 120*a* or 120*b* in FIG. 12). Systems according to such embodiments can be advantageous to substantially eliminate problems or damages arising from arcing between conductive tubes.

Another embodiment of a system according to the present disclosure is shown in FIG. 13. As seen therein, the system comprises a launcher 200 positioned within the bore 101 of a launch tube 100. In this embodiment, the launch tube 100 can be formed of a tube 180 that can include a passage 180*a* along at least a portion of the length thereof. The cross-section of FIG. 13 is through the passage 180*a*, and such passage (or a plurality of such passages) can be positioned anywhere around the circumference of the launch tube 100. The passage 180*a* can be configured to permit passage of a power beam 360*a* therethrough and thus may comprise, for example, an open slot, an optically transparent material, or a material otherwise configured to permit passage of the power beam 360*a*. The launcher 200 comprises a payload 240, a propellant tank 230, an electrical heater 220, and an expansion nozzle 210. The electrical heater 220 includes a wall aperture 220*a* that is configured to permit passage of the power beam 360*a* reflected from a tracking reflector 370 or like tracking element. The tracking reflector 370 can include the necessary electronic components adapted for computerized tracking of the launcher such that the power beam 360*a* is tracked to the launcher position, continuously or in a pulsed fashion, as the launcher is accelerated through the launch tube such that the power beam is delivered to the electrical heater 220 of the launcher continuously, or in a pulsed fashion, as the launcher passes through the launch tube. In use, electrical energy from an electrical energy source 300 (e.g., a battery) passes through an inductor 350 and into a beaming element 360 that is configured to deliver a power beam 360*a* to the electrical heater 220 and thus source the electrical energy required to heat the propellant from the propellant tank 230 and cause it to expand out of the nozzle 210 and accelerate the launcher 200 through the launch tube 100. In some embodiments, the beaming element 360 can comprise a laser, and power beam 360*a* thus may be a laser beam. In other embodiments, the beaming element 360 can comprise a microwave generator or other radio wave generator, and the power beam 360*a* thus may comprise microwaves or other radio waves. In still other embodiments, the energy beam can be a millimeter wave beam. Optionally, the electrical heater 220 can comprise one or more elements adapted to convert laser energy, microwaves, or other radio waves into electrical current.

In some embodiments, a tracking reflector and a beaming element can be utilized to direct heating energy to the atmosphere in front of the flyout payload. For example, the beaming element can comprise a laser, and the laser beam can be tracked to the movement of the launch vehicle so that the laser projects directly in front of (or forward to) the flyout payload. In such embodiments, the laser beam can be utilized to explosively heat the atmosphere directly forward to the flyout payload. This can create a partial vacuum in front of the flyout payload and thus reduce aerodynamic drag that reduces the velocity of the flyout payload after it exits the launch tube.

In some embodiments, the launch tube can be aligned by active alignment devices. Further, the tube can be defined as being substantially horizontal with the exception of a section defining and tube exit, where the tube may curve upward. The tube also can be characterized as substantially following the curvature of the Earth. The tube can be at a constant slope angle, and tube bed can be graded to the tube constant slope angle. Further, the launch tube can be installed on naturally sloping ground. Alternatively, the launch tube can be installed in a slanted tunnel underground. In certain embodiments, the launch tube can be moveable. For example, the launch tube can be moveable in one dimension to change launch elevation or launch azimuth. Preferably, the launch tube can be moveable in two dimensions, as this can be beneficial to enable change in both elevation and azimuth. If desired, the launch tube can be mounted on a moveable vehicle such as a ship or a submarine. In certain embodiments, the launch tube can be defined by an initial launch section and a main launch section. The initial launch section can be, for example, at least 100 meters in length, up to approximately 1,000 meters in length, or about 100 to about 1,000 meters in length, and the main launch section can be, for example, approximately 1,000 meters or greater in length.

The launch tube specifically may be evacuated. Further, the launch tube may be backfilled with a light gas, preferably at low pressure. This can be beneficial to minimize aerodynamic drag during acceleration while providing increased resistance to arc breakdown ahead of the launch package. In particular embodiments, the launch tube can be evacuated, and a high speed pulse of gas can be introduced time sequentially along the tube so as to coat the tube walls with a layer of gas. This can function to insulate the tube walls and can be configured such that there is insufficient time for the gas to expand from the wall into the majority of the tube diameter and thus increase aerodynamic drag. Such introduction of gas can be via transpiration or ports through the tube walls.

The launch tube exit can be sealed with a device to substantially or completely prevent air ingress until the launch package arrives. In various embodiments, the exit seal can be, for example, a high speed mechanical shutter, one or a series of aerodynamic curtains, or a relatively thin membrane or combination of multiple membranes through which the launch package can safely fly. When the exit device is a thin membrane or membranes, one or several small explosive charges may be provided to destroy the membrane prior to arrival of the launch vehicle at the exit. Such charges can particularly function as a fail safe mechanism. For example, the explosive charges may be used to intentionally damage a projectile prior to letting it leave the launch tube such that the projectile disintegrates almost immediately upon exiting the launch tube so as to abort a launch which does not meet specified requirements.

The present system is beneficial in that solid rocket-like thrust to weight ratios can be achieved in part by eliminating the power supply from the moving package. By powering the launcher from a stationary supply it is possible to eliminate a significant amount of the moving weight of the launcher. Referring to FIG. 14, an electrical energy source 300 can be provided to supply electrical energy to the launch tube 100, which comprises an initial launch tube section 103, a main launch tube section 105, and a launch tube exit 107. The energy source 300 can be recharged periodically as necessary, such as from the electrical grid or a dedicated generation system 375. In certain embodiments, the electrical energy source 300 can comprise a battery bank. For example, a series parallel combination of lead acid batteries (e.g., automotive batteries) may be used. Any further battery or suite of batteries suitable for providing electrical energy on demand likewise may be used. In particular embodiments, an inductor 350 can be interposed between the battery bank and the launch tube such that the battery bank charges the inductor while the inductor is in a charging state. Thereafter, the inductor 350 can be switched to a discharging state wherein the inductor discharges into the launch tube. The discharge into the launch tube may be initiated by explosively actuated switches. Alternatively, the discharge switching may comprise the use of conventional switches with capacitor mediated arcing control. Preferably, the inductor can have a core comprising a high permeability material. In particular, the core can be adapted for high discharge rates and low eddy current losses. Moreover, the inductor can be actively cooled, the core can be actively cooled, and/or the conductors can be actively cooled. Inductors according to the present disclosure particularly can be configured to provide a drive current of at least 0.2 mega-amps, at least 1 mega-amp, at least 2 mega-amps, at least 3 mega-amps, at least 5 mega-amps, or at least 10 mega-amps.

Any power source adapted to provide the electrical drive current requirements as described herein can be used as the electrical energy source according to the present disclosure. Non-limiting examples of electrical energy sources that may be used include capacitors, standard power plant generators, rocket turbine driven turbogenerators, and the like. In relation to cost and reliability, batteries (e.g., lead acid batteries) driving an inductor as described above can be preferred.

In some embodiments, a battery charged inductor system can be useful. For example, the battery bank can store about 800 GJ and charge an inductor at about 500 volts at five million amps. The inductor can discharge into the launch tube at up to about 10,000 volts at five million amps (or 50 gigawatts). The inductor can store about 270 GJ and deliver about 90 GJ to the launch tube. Of the 90 GJ delivered to the launch tube, about 32 GJ can be delivered to the launcher or launch package. As an example, a launcher in the launch tube can have a starting weight of about 1,000 kg. As the propellant tank, electrical heater, and expansion nozzle can remain in the launch tube, the package leaving the launch tube can have a weight of about 330 kg. For example, the ratio of the mass of the package leaving the launch tube relative to the mass of the launch vehicle at the start of launch can be about 0.1 to about 0.8, about 0.2 to about 0.6, or about 0.3 to about 0.5.

In use, the launch vehicle 200 is initially positioned inside the launch tube 100 near the staging station 109 in the initial launch tube section 103. The launch system 20 can comprise additional elements as illustrated in FIG. 14, such as the payload preparation and launch operations building 400 and the grid connection or generating system 375. Briefly, in use, electrical energy is transferred from the pre-charged electrical energy source 300 via conduit 301 to the inductor 350 and then through conduit 351 to the launch tube 100. The conduit 351 can correlate to or be interconnected with the electrical lines 170 shown in FIG. 10-FIG. 12. The electrical energy passes through the conductive launch tube to the electrical heater 220 via a mechanism as described herein (e.g., using sliding contacts, plasma arc transfer, passage through the conductive tubes, and passage through the launch tube bore). Propellant from the propellant tank 230 is heated in the electrical heater 220 and exits the expansion nozzle 210 at a velocity in the range of about 5 to about 20 km/s, about 6 to about 18 km/s, or about 7 to about 16 km/s to propel the launch vehicle 200 down the launch tube 100.

The launch vehicles provided according to the present disclosure can be configured to achieve high thrust to weight ratio propulsion. In some embodiments, the thrust to weight ratio can be greater than 1:1, greater than 10:1, greater than 30:1, greater than 50:1, greater than 100:1, greater than 500:1, or greater than 1,000:1.

The propellant that is heated in the electrical heater 220 can comprise a light gas, and preferably is a gas that is ionizable at high temperatures. In some embodiments, the light gas used as the propellant can be hydrogen. The electrical heater 220 preferably is adapted to heat the hydrogen or other propellant to a high temperature, such as in the range of about 1,000 K to about 100,000 K, about 2,000 K to about 50,000 K, about 2,500 K to about 20,000 K, about 3,000 K to about 15,000 K, about 3,500 K to about 10,000 K, or about 3,500 K to about 5,000 K. In some embodiments, the exhausted gas exiting the expansion nozzle 210 can be molecular hydrogen (i.e., with a molecular weight of 0.002 kg/mole). As such, the bore of the launch tube trailing the launcher can be substantially filled with hydrogen gas. In further embodiments, the exhausted gas exiting the expansion nozzle 210 can be atomic hydrogen (i.e., with a molecular weight of 0.001 kg/mole). In still further embodiments, the exhausted gas exiting the expansion nozzle 210 can be hydrogen plasma (e.g., with a molecular weight of 0.0005 kg/mole).

Although hydrogen is exemplified above, other materials having a relatively low molecular weight may be utilized. For example, diborane, ammonia, methane, and water may be used in some embodiments as the propellant. Various combinations of propellants can be used.

In some embodiments, the electrical heater can comprise an arcjet rocket or the like. Specifically, the heater can be of any suitable design adapted to provide an electrical discharge, or arc, in a flow of the propellant and thus provide propulsion.

A launcher rocket engine (i.e., an electrical heater combined with an expansion nozzle) according to the present disclosure can be configured to provide a high specific impulse (Isp). In some embodiments, launcher rocket Isp can be at least 500 sec, at least 600 sec, at least 700 sec, at least 1,000 sec, at least 1,500 sec, or at least 2,000 sec (e.g., in the range of 500 to 2,000 sec).

In one exemplary embodiment, the electrical heater 220 can comprise a resistive heater such as illustrated in FIG. 15. The resistive heater 1200 can comprise a resistive heater shell 1210 encasing a heat exchanger 1220 that is electrically heated. Although a single heat exchanger (or heating element) is illustrated, it is understood that a plurality of heating elements can be provided within a single heater shell, and advantages of such embodiments are further discussed below. The resistive heater shell may define a containment vessel. The heat cylinder (heat exchanger) can be formed of a variety of materials and composite structures. For example, a low density, high melting point material such as carbon may be used. In some embodiments the heat exchange cylinder may comprise carbon coated with a further material, such as diamond, tungsten, hafnium carbide, or multiple layers of one or more different materials. Such can be beneficial to improve heat transfer performance, strength, and reliability. The heat cylinder can be a transpiration tube element. For example, a porous tungsten heat cylinder can be used. The resistive heater shell 1210 can comprise any material suitable to contain the hot, expanding gas exiting the porous heat cylinder 1220 for controlled discharge through a gas discharge port 1215. The propellant gas 5 enters the resistive heater 1200 through gas entry port 1213 through which it passes into the open core 1223. Inside the porous heat cylinder 1220, the propellant gas 5 is heated to a temperature as described herein via electrical resistance heating from the electrical current passing through the electrical terminals (1203, 1205). The heated gas expands (or transpires) outward through the pores in the porous heat cylinder walls 1221 and fills the expansion chamber 1230 of the resistive heater 1200 prior to exiting the resistive heater 1200 through the discharge port 1215. In some embodiments, an electrical heater can comprise a heating chamber, a heat exchanger, and a discharge nozzle or port. In particular, one or all of the heating chamber, heat exchanger, and nozzle can be cooled, such as with transpiration cooling.

In another exemplary embodiment, the electrical heater 220 can comprise an arc heater such as illustrated in FIG. 16. The arc heater 2200 can comprise an arc heater shell 2210 encasing a swirl chamber 2230. The arc heater shell may define a containment vessel and may comprise transpiration cooled walls. The propellant gas 5 enters the arc heater 2200 through gas entry port 2213 through which it passes into the swirl chamber 2230 wherein the propellant gas is heated to a temperature as described herein via electrical arc passing between the electrical terminals (2203, 2205). As illustrated, the electrical terminals (2203, 2205) of the arc heater 2200 can be coaxial and spaced apart by the swirl chamber 2230. In some embodiments, the electrical terminals can be transpiration cooled. The arc vortex within the swirl chamber 2230 can be vortex stabilized. In particular, the propellant gas 5 is injected tangentially into the swirl chamber via gas entry port 2213 rather than coaxially with the gas discharge port 2215. This can form a helical vortex as the fluid is heated by the arc discharge before being expanded through the gas discharge port 2215. Arc stability, heat transfer, and reliability may be improved by swirl stabilization, as well as transpiration, seeding, and like means.

In some embodiments of the present disclosure, it can be preferred to minimize the required drive current. Accordingly, in some embodiments the geometry of an electrical heater can be configured to maximize heater resistance, which can then allow for a relatively low current requirement with a simultaneous relatively high power output. As an exemplary embodiment, in relation to either a resistive heater or an arc heater, the length of the heating element can be increased, and the diameter of the heating element can be decreased. In particular, a long, thin, continuous heating element can be used. In some embodiments, the heating element can be configured as a serpentine structure within the overall heater. In other embodiments, a combination of heating elements can be provided within a single heater shell, and the propellant flow to each element can be fed in parallel. The electrical current flow in such embodiments can be provided in series through the multiple heating elements. Two, three, four, or even more heating elements can be utilized within a single heater shell, and the total number of heating elements utilized can be matched to the desired resistance. In embodiments where it is desirable to achieve a high heater resistance per unit volume, a single heating element, as shown in FIG. 15 and FIG. 16 can be used, and the geometry can be altered so that the heater is wider and shorter in order to lessen the heater resistance.

Although hydrogen gas is a preferred propellant, other propellants may be used, and various materials may be combined. For example, the propellant gas may be seeded with an ionizable element and/or a further reactive element and/or an inert element. Non-limiting examples include cesium, rubidium, potassium, sodium, lithium, lithium hydride, argon, oxygen, and helium. The presence of such additional elements can be useful to promote arc stability, conductivity, and ionization. In some embodiments, the seeded elements may be present as only a small fraction of the total mass of propellant, such as less than about 5%, less than about 4%, less than about 3%, less than about 2%, or less than about 1% by mass.

In some embodiments, a further pressurant may be included and can be provided within the propellant tank or within an interconnected component. The pressurant can be useful to maintain a substantially constant flow of propellant to the electrical heater. As a non-limiting example, helium or a further non-reactive gas may be utilized as the pressurant. Other means, such as a pump can be used. A pump 250 is shown in FIG. 17 between the propellant tank 230 and the electrical heater 220. The pump 250 can be pyrotechnically driven or beneficially may be electrically driven due to the availability of the high electric power flow from the launch tube.

The expansion nozzle can take on any form suitable for expansion of the hot gas exiting the electrical heater so as to accelerate the launch vehicle in the manner described herein. In some embodiments, the exhaust nozzle can comprise a porous nozzle throat. Preferentially, the pores can be filled with a material that absorbs heat, such as by one or more of melting, vaporization, and disassociation. In certain embodiments, the heat absorbing material can comprise solid hydrogen, solid lithium, or water ice. In further embodiments, the exhaust nozzle can include a nozzle throat that is transpiration cooled, such as with a light gas, including hydrogen gas.

The propellant tank 230 utilized with the launch vehicle 200 may be reusable. Preferably, the propellant tank is sized to include a sufficient volume of propellant (e.g., high pressure gas; liquid, semi-solid slush hydrogen, lithium hydride, water, or other materials that yield low molecular weight gases and high exhaust velocities upon being heated to high temperatures) to achieve exit of Earth's atmosphere or to substantially exit Earth's gravitational pull. In some embodiments, the propellant tank can be substantially cylindrical in shape. In some embodiments, the propellant tank can be formed of carbon composite materials. The propellant tank particularly can be adapted to support the mechanical load of payload positioned in front of the tank, minus the pressurization between the tank and the payload, as further discussed below.

The propellant tank can be sized to have an outer diameter that is substantially identical to the inner diameter of the launch tube. In some embodiments, the propellant tank is in physical contact with the inner wall of the launch tube over a portion of the outer surface of the tank. In specific embodiments, the propellant tank may include sliding contact strips on at least a portion of the outer surface. As such, the majority of the tank structure is positioned slightly away from the tube inner surface. The sliding contact strips can be adapted to vaporize as the velocity of the launch vehicle increases and provide a low drag gas bearing to minimize frictional drag. The strips can be designed to produce a vapor that is insulating so that it inhibits rather than promotes any arcing. For example, the sliding contact strips may comprise pores filled with liquid sulfur hexafluoride. In some embodiments, bearings or the like may be utilized between the propellant tank and the inner wall of the launch tube.

The location of a launch system according to the present disclosure can vary. In some embodiments, the launch system can be located on the Earth. In other embodiments, the launch system can be at a non-terrestrial location, including in free space or on another celestial body.

During launch of the launch vehicle, the exit velocity can be in the range of about 2,000 to about 50,000 m/sec, about 4,000 to about 30,000 m/sec, about 6,000 to about 15,000 m/sec, or about 8,000 to about 12,000 m/sec. In some embodiments, the launch vehicle initially can be accelerated to a velocity of about 100 to about 5,000 m/sec using an alternate acceleration means. For example, the initial launch velocity can be achieved using a single stage light gas gun. In such embodiments, the light gas (e.g., hydrogen) can be preheated, particularly electrically preheated, and more particularly preheated using electrical heating that is derived from the same energy supply as the launch vehicle. In alternate embodiments, the initial velocity achieved by such means can be about 250 to about 4,000 m/sec or about 1500 to about 2500 m/sec.

As discussed above in relation to the propellant tank, the launch vehicle can be stabilized in one or more manners during passage though the launch tube. One exemplary method is the use of the sliding contact strips on the propellant tank. In other embodiments, the launching method can be particularly important. For example, in certain embodiments, electrical heating is not utilized during the initial launch stage. As seen in FIG. 14, the launch tube 100 can comprise an initial launch tube section 103. In this section, the launch vehicle can be accelerated via a hot expanding gas (e.g., hydrogen). The utilization of a light gas gun model at the initial launch stage can be useful to accelerate the launch vehicle to as high a velocity as possible before electrically power thrust is initiated. This can conserve propellant from the launch vehicle propellant tank and also conserve electrical energy. This also can ensure that the sliding electrical contacts are already moving at a high velocity before they begin conducting current. This can be particularly relevant when the sliding contacts are adapted for state transitions. The initial launch tube section (i.e., the first stage launcher) typically is not powered and is electrically isolated from the second stage launch tube. This can be beneficial to avoid low velocity conduction where overheating may occur arising from excessive contact duration of the sliding contacts at any given point on the conductive launch tube wall.

In some embodiments, the launch vehicle can be further stabilized within the launch tube via differential pressurization. As illustrated in FIG. 17, shaded areas 150 around the launch vehicle positioned within the launch tube can be differentially pressurized to minimize acceleration induced mechanical stress on structures, particularly the nozzle, the heater, the propellant tank, and the payload.

Electrical heating of a low molecular weight gas, such as hydrogen, can provide a uniquely high speed rocket exhaust as noted above that has heretofore been unattainable with known chemical rocket technology. This in turn can lead to designs that can achieve, in exemplary embodiments, 10% to 70% payload fractions to orbit. Accordingly, rather than requiring the use of a rocket having a mass on the order of 50 to 500 tons, the launch systems of the present disclosure can launch packages in a cost effective manner, the packages being orders of magnitude smaller than rocket-based systems (e.g., 0.05 to 1 ton or 0.2 to 2 tons).

The launch vehicle specifically can be configured to be accelerated inside an evacuated tube rather than in free flight. The launch vehicle preferably can be disallowed from exiting the launch tube unless the system confirms safe launch conditions exist. After exiting the launch tube, the launch vehicle can maneuver through the atmosphere to orbit or to a specific destination (e.g., an extraorbital site in relation to space flight or a defined terrestrial location in relation to intra-atmospheric launches).

As seen in FIG. 17, the launch vehicle 200 can comprise a payload 240. The payload 240 can be removably connected to the propellant tank 230. As illustrated, a payload connection element 250 can be used to provide the connection, and any suitable means for removably connecting the payload 240 to a further component of the launch vehicle 200 can be used. The launch system 20 further can include a payload stabilizer 260, which can comprise one or more arms or like element that is positioned between the payload 240 and the inner tube wall 130 (preferably near the forward tip of the payload) and stabilizes the payload against radial movement while passing through the tube 100. The payload stabilizer 260 preferably disengages from the payload at or near the exit 107 of the launch tube 100.

The payload can be a container housing various types of cargo, including, but not limited to, human passengers, consumable resources, communication equipment, power components, arms, ordinances, raw materials, and the like. The nature of the cargo can, in some embodiments, define certain parameters of the launch system. For example, the dimensions of the launch tube and acceleration of the launch vehicle can be different for human passengers or cargo subject to adverse effects of experiencing excessive G forces. In some embodiments, the length of the launch tube 100 in meters as shown in FIG. 14 (particularly the main launch tube section 105) can increase as the cube root of the launched mass in kilograms. In some embodiments, a launch tube can have a length of up to about 50 miles, up to about 100 miles, up to about 250 miles, up to about 500, or up to about 1000 miles. Further, launch conditions for humans, etc. can be limited such as to about 2 G's to no more than 60 G's acceleration. In certain embodiments, the length of the launch tube 100 in meters can be equal to the square of the launch velocity divided by twice the average acceleration of the launch.

Further considerations in relation to the launch package are described below. In some embodiments, the launch package can have inertial sensors and actuators that actively maintain its alignment and orientation while being accelerated in the launch tube. In some embodiments, the launch package can be monitored during the launch acceleration interval for integrity and nominal performance. Preferably, emergency procedures can be implemented based on monitoring results to optimize the launch and to protect the launch tube. Further, the launch can be aborted by destroying the launch package immediately or shortly after its exit from the launch tube. In some embodiments, the launch package can be separated from the remaining components of the launch vehicle during or immediately after launch. These separate components can be defined as a flyout payload portion and a discarded or recycle portion. Separation of components can be significantly rapid and can utilize, for example, a gas bag discharge or explosive bolt disconnects. The separation can be aided by the aerodynamic forces after exit. In particular embodiments, the flyout payload can have a heat shield with a transpiration cooled or an extruding nosetip to maintain the nosetip integrity, shape, sharpness, low drag, and low pressure moment during exit from the atmosphere. A high performance heat shield used according to the present disclosure can be configured to substantially prevent damage at a velocity (measured as sea level) of at least 6 km/s, at least 8 km/s, at least 10 km/s, at least 12 km/s, or at least 14 km/s.

In some embodiments, the flyout payload can have a small positive stability, neutral stability, or a negative aerodynamic stability based on its center of pressure location relative to its center of mass location. In some embodiments, the flyout payload can maneuver at high lateral acceleration levels to optimize flight path through the atmosphere and change launch azimuth. In some embodiments, the flyout payload can have a high lift to drag ratio. In some embodiments, the payload can have a lifting body design. In some embodiments, the flyout payload can have aerodynamic control surfaces with very high speed response and low drag. In particular, the surfaces can be base split flaps or the surfaces can be actuated with piezoelectric actuators.

In some embodiments, the flyout payload can be an orbital satellite. For example, the satellite can be a communications satellite, a sensor satellite, resupply vehicle, or a weapon. In some embodiments, the flyout payload can be a suborbital payload. For example, the payload can be a commercial package to be delivered rapidly to long distances, the payload can be a sensor payload, the payload can be a UAV or other unmanned vehicle, or the payload can be a weapon. In such embodiments, the payload may contain subparts that can be dispersed before impact, the payload can remain intact until impact, or multiple payloads can impact at or near the same location for deep penetration. In some embodiments, the satellite can contain an inflatable solar array for power. In some embodiments, the satellite can contain an inflatable magnet array to provide for attitude control in orbit. In some embodiments, the satellite can contain an inflatable antenna array to effect communications in orbit. In some embodiments, satellite contains inflatable structures to effect missions in orbit. In particular, the inflatable structures can harden to rigidity after deployment.

In some embodiments, the design lifetime of the satellite can be less than about 10 years, less than about 5 years, less than about 2 years, or less than about 1 year. In some embodiments, the satellite orbital altitude can be such that the orbital lifetime due to aerodynamic drag can be less than about 5 years, less than about 2 years, less than about 1 year, less than about 6 months, less than about 3 months, or less than about 1 month. In some embodiments, the satellite can achieve longer orbital lifetime through magnetic thrust against the Earth's magnetic field using an inflatable magnetic array, through pressure induced by sunlight and solar wind on an inflatable solar sail, or through magnetohydrodynamic (MHD) propulsion against ionized upper atmosphere molecules.

The launch system of the present disclosure can provide certain advantages over known space launch systems. In some embodiments, payload cost can be reduced through using commercial grade parts with high initial failure rates and then iterating quickly through launch, fail, and redesign cycles to achieve higher and higher reliability quickly over time. Further, the launcher and up to thousands of payloads can be designed simultaneously for a single purpose, if desired. In some embodiments, the payloads can be all communication satellites. In some embodiments, the satellites can be radiofrequency communication satellites. In some embodiments, the satellites can be optical communications satellites. In some embodiments, the payloads can be reflective relays for millimeter waves or optical beams. In some embodiments, the payloads can be nuclear waste containers. In some embodiments, the flyout payload can have a heat shield with a porous nosetip filled with a material that absorbs heat by melting and/or vaporization and/or disassociation to maintain the nosetip integrity, shape, sharpness, low drag, and low pressure moment during exit from the atmosphere. In particular, the material can be solid hydrogen or lithium or ice.

One embodiment of a payload for a launch vehicle according to the present disclosure is provided in FIG. 18 (in an atmospheric transit configuration) and FIG. 19 (in an in-orbit deployed configuration). The embodiment illustrates an example integrating launch capabilities, satellite structure, and communications services. Specifically, FIG. 18 shows an external view of the exemplary launch vehicle payload component as well as a cut-away view revealing an exemplary compartmentalization of the multiple elements of the payload component. In the external view, the payload component 1700 has a conical shape to provide favorable aerodynamics, but other shapes are also encompassed. The payload component specifically is shown with aeromaneuver flaps 1710 and a nose cone heat shield 1720. In some embodiments, an ablating rod 1725 can be included at the nose of the payload component 1700. The ablating rod 1725 can be configured to extrude forward from the nose as the forward end of the rod is ablated away. In the internal view, the payload component houses (from base to tip) an orbital insertion motor 1730, orbital insertion propellants 1740, a solar cell array 1750, attitude control 1760, a communications payload 1770, and avionics 1780. The illustration of FIG. 19 shows the remaining aerobody of the payload component 1700 in connection with its inflated solar arrays 1810, inflated attitude control system 1820, and inflated communications antenna 1830. Further examples of a payload carrying a variety of useful elements for orbital delivery are provided in U.S. Pat. No. 6,921,051, the disclosure of which is incorporated herein by reference in its entirety.

In further embodiments, the present disclosure can provide methods for launching a payload. For example, in certain embodiments, the present disclosure can provide an electroantimagnetic launch method for accelerating a launch vehicle. The method can comprise electrically heating a propellant to form an expanding gas that accelerates the launch vehicle through a launch tube to a velocity of at least about 5,000 m/s with an acceleration force of about 2 to about 2,000 G's while limiting a magnetic field within the tube to no more than about 2 Tesla. The launch method can be defined by a variety of combinations of the several elements of the EAM launch system as otherwise described herein.

In an exemplary embodiment, a launch tube according to the present disclosure can have a diameter of about 1.2 meters and a length of about 16,000 meters. The tube can be evacuated. The launch acceleration can be about 225 G, and the launch cycle can be about 4 seconds.

EXAMPLE

Mathematical modeling of launch systems was carried out to exemplify the advantages of the presently disclosed EAM launcher, particularly in relation to typical, prior art EM launchers. Prior art EM launcher modeling was based upon the following equation:

$$F=MA=0.5 \times L' \times I^2$$

wherein F is force in Newtons, M is mass in kg, A is acceleration in meters per second squared, L' is the increase in inductance per meter of travel in the launch tube in microhenries per meter, and I is current in amps.

Modeling of a Typical Known Art Railgun (for a 1 Ton Payload)

Modeling for a prior art railgun was carried out as follows:
L'=5×10$^{-7}$ H/m;
I=20×10$^6$ A;
M=1,000 kg;
F=0.5×(5×10$^{-7}$)×(20×10$^6$)$^2$=0.5×(5×10$^{-7}$)×(400×10$^{12}$)=1×10$^8$N
A=F/M=1×10$^5$ m/sec$^2$=10,000 G's.

Typical efficiency historically demonstrated by EM railguns for only a few grams at 6000 m/sec has been about 0.1% to 1%.

Typical efficiency demonstrated by EM railguns for a few hundred grams at 3000 m/sec has been about 10-15%.

Modeling of a Typical Known Art Coilgun (for a 1 Ton Payload)

Modeling for a prior art coilgun was carried out as follows:
L'=125×10$^{-7}$ H/m;
I=4×10$^6$ A;
M=1,000 kg;
F=0.5×(125×10$^{-7}$)×(4×10$^6$)$^2$=0.5×(125×10$^{-7}$)×(16×10$^{12}$)=1×10$^8$N;
A=F/M=1×10$^5$ m/sec$^2$=10,000 G's.

Highest velocity ever achieved by a coilgun was about 1000 m/sec.

Key problem is that the drive voltages required are:
Drive voltage=V=L'×I×Velocity
=(125×10$^{-7}$)×(4×10$^6$)×8000=400,000 volts.

It is believed that no previous work has heretofore achieved voltages over about 50,000 volts in a coil launcher, and this among other factors has limited the velocities that can be attained. Moreover, capacitors are the only known power source to drive a coilgun. When considering an efficiency of 20%, one ton at 8800 m/sec requires 194 Gigajoules of capacitors. As capacitor power supplies presently cost roughly $1/Joule, this model would require $194 B for the power supply alone.

EAM Launcher According to the Present Disclosure (for a 1 Ton Payload)

Modeling for an EAM launcher according to the present disclosure was carried out as follows:
L'=1×10$^{-8}$ H/m
I=2×10$^6$ A
Magnetic force (F)=[0.5×(1×10$^{-8}$)×(2×10$^6$)$^2$]=[0.5×(1×10$^{-8}$)×(4×10$^{12}$)]=[2×10$^4$ N]
A=F/M=20 m/sec$^2$=2 G's (so the magnetic "push" is 2 G's, versus the "gas nozzle push" of around 225 G's). Gas nozzle push was calculated as follows:
Propellant flow rate=dM/dt=180 kg/s;
Exhaust velocity=V$_{exhaust}$=12,500 m/s;
Thrust=Newtons=dM/dt×V$_{exhaust}$=180×12,500=2.25×10$^6$; and
A=F/M=2,250 m/s=225 G's.

As seen above, the present EAM launcher can lower required electrical current by 10 fold versus the railgun and 2 fold versus the coilgun, thus reducing the resistive and arcing and magnetic energy storage losses by 100 times and 4 times respectively. The lower launcher current makes it compatible with low cost power supplies.

The rocket propulsion effect has been demonstrated to achieve velocities over 20,000 m/sec in space. The presently disclosed EAM launcher is particularly advantageous in light of the combination of an electrically powered rocket in a conductive tube designed to maximize propulsion force per unit current while eliminating magnetic fields and forces to the maximum extent possible. This lowers losses due to resistive heating losses, arc losses, and stored magnetic energy losses.

Many modifications and other embodiments of the disclosure will come to mind to one skilled in the art to which this disclosure pertains having the benefit of the teachings presented in the foregoing descriptions and the associated drawings. Therefore, it is to be understood that the disclosure is not to be limited to the specific embodiments disclosed herein and that modifications and other embodiments are intended to be included within the scope of the appended claims. Although specific terms are employed herein, they are used in a generic and descriptive sense only and not for purposes of limitation.

The invention claimed is:

1. A launch vehicle adapted for high velocity delivery of a payload, the launch vehicle comprising:
   a payload container;
   a propellant tank containing a propellant;
   an electrical heater in fluid connection with the propellant tank and adapted for electrical heating of the propellant to form an exiting exhaust; and
   one or more electrical conductors comprising sliding electrical contacts and configured to direct flow of electrical current from an external source to the electrical heater, and comprising arms positioned between the sliding electrical contacts and the electrical heater.

2. The launch vehicle according to claim 1, further comprising an expansion nozzle in fluid communication with the exiting exhaust from the electrical heater.

3. The launch vehicle according to claim 1, wherein the electrical heater is a resistive heater.

4. The launch vehicle according to claim 3, wherein the resistive heater comprises at least one electrically heated porous cylinder inside a containment vessel.

5. The launch vehicle according to claim 4, wherein the electrically heated porous cylinder comprises carbon walls.

6. The launch vehicle according to claim 5, wherein the carbon walls include a coating material selected from the group consisting of diamond, tungsten, hafnium carbide, and combinations thereof.

7. The launch vehicle according to claim 4, wherein the electrically heated porous cylinder is a transpiring tungsten-containing cylinder.

8. The launch vehicle according to claim 4, wherein the resistive heater comprises a discharge port in fluid communication with a chamber that is internal to the containment vessel and external to the electrically heated porous cylinder.

9. The launch vehicle according to claim 1, wherein the electrical heater is an arc heater.

10. The launch vehicle according to claim 9, wherein the arc heater comprises a swirl chamber within a containment vessel.

11. The launch vehicle according to claim 10, wherein the containment vessel comprises transpiration cooled walls.

12. The launch vehicle according to claim 10, wherein the swirl chamber is configured to establish a swirl stabilized electrical vortex arc.

13. The launch vehicle according to claim 10, wherein the arc heater comprises coaxial electrical terminals spaced apart by the swirl chamber.

14. The launch vehicle according to claim 1, wherein the sliding electrical contacts comprise an inner conductor at least partially surrounded by an outer rim.

15. The launch vehicle according to claim 14, wherein the outer rim is configured for transpiration cooling.

16. The launch vehicle according to claim 15, wherein the outer rim is porous.

17. The launch vehicle according to claim 16, wherein pores in the porous outer rim are at least partially filed with a cooling material.

18. The launch vehicle according to claim 17, wherein the cooling material is selected from the group consisting of hydrogen, sulfur hexafluoride, and combinations thereof.

19. The launch vehicle according to claim 14, wherein the sliding electrical contacts further comprise one or more of a magnetic rim, an ablative shield, an inner cooled rim, and an ablative rim between the inner conductor and the outer rim.

20. The launch vehicle according to claim 1, wherein the sliding electrical contacts are configured to receive the electrical current from a plasma arc.

21. The launch vehicle according to claim 1, wherein the electrical conductors comprise elongated conductive elements attached to or integral with one or both of the payload container and the propellant tank.

22. The launch vehicle according to claim 21, wherein the elongated conductive elements are configured to receive the electrical current from a plasma arc.

23. The launch vehicle according to claim 1, wherein the propellant tank comprises one or more sliding contact strips on at least a portion of an outer surface of the propellant tank.

24. The launch vehicle according to claim 23, wherein the sliding contact strips are configured to be vaporizable.

25. The launch vehicle according to claim 1, wherein the payload container comprises one or more of a human or animal passenger, a satellite, a vehicle, a commodity, and a weapon.

26. The launch vehicle according to claim 1, wherein one or all of the payload container, the propellant tank, and the electrical heater are reusable.

27. The launch vehicle according to claim 1, wherein the propellant is selected from the group consisting of hydrogen, diborane, ammonia, methane, and combinations thereof.

28. The launch vehicle according to claim 1, wherein the vehicle is configured to provide a specific impulse (Isp) of at least 500 sec.

29. The launch vehicle according to claim 1, wherein the electrical heater is configured to heat the propellant to a temperature of about 1,000 K to about 100,000 K.

30. The launch vehicle according to claim 1, wherein the exiting exhaust is selected from the group consisting of molecular hydrogen, atomic hydrogen, hydrogen plasma, and combinations thereof.

31. The launch vehicle according to claim 1, wherein the payload container comprises a heat shield.

32. The launch vehicle according to claim 31, wherein at least a portion of the heat shield is configured for transpiration cooling.

33. The launch vehicle according to claim 1, wherein the vehicle is configured to provide a thrust to weight ratio of greater than 10:1.

34. The launch vehicle according to claim 1, further comprising a propellant pump in fluid communication with the propellant tank and the electrical heater.

35. The launch vehicle according to claim 34, wherein the propellant pump is a pyrotechnically driven pump or is an electrically driven pump.

36. A launch system comprising:
  1) a launch tube comprising at least one tube configured for transmission of energy therethrough
  2) a launch vehicle comprising:
  a payload container;
  a propellant tank containing a propellant;
  an electrical heater in fluid connection with the propellant tank and adapted for electrical heating of the propellant to form an exiting exhaust;
  a propellant pump in fluid communication with the propellant tank and the electrical heater; and
  one or more electrical conductors configured to direct flow of electrical current to the electrical heater; and
  3) an electrical energy source;
  wherein the launch tube is configured for propulsion of the launch vehicle therethrough.

37. The launch system according to claim 36, wherein the launch tube comprises an inner electrically conductive tube and an outer electrically conductive tube separated by a coaxial insulator tube.

38. The launch system according to claim 37, wherein the inner electrically conductive tube comprises one or more slotted tracks extending at least partially along the length thereof.

39. The launch system according to claim 38, wherein the one or more slotted tracks are configured to receive the electrical conductors of the launch vehicle.

40. The launch system according to claim 37, wherein the ratio of the radius of the outer electrically conductive tube to the radius of the inner electrically conductive tube is 2.

41. The launch system according to claim 36, wherein the launch tube is configured to limit any magnetic field formed by passage therethrough of an electrical current of about 0.2 to about 2 million amps such that the magnet field is at a strength of less than about 1.25 Tesla.

42. The launch system according to claim 36, wherein the launch tube is evacuated of ambient air.

43. The launch system according to claim 36, wherein the launch tube comprises a tube bore surrounded by an insulator tube and an electrically conductive tube, and wherein the launch tube is configured for passage of electrical current through an induced plasma arc within the launch tube bore.

44. The launch system according to claim 43, wherein the electrically conductive tube is separated from the launch tube bore along the length thereof by the insulator tube but is in electrical connection with the launch tube bore proximate a terminal end of the launch tube.

45. The launch system according to claim 44, further comprising a rearward electrically conductive element at an opposing, beginning end of the launch tube.

46. The launch system according to claim 45, wherein the system is configured for passage of electrical current forward through the electrically conductive tube and rearward through the launch tube bore and the one or more electrical conductors of the launch vehicle to the rearward electrically conductive element.

47. The launch system according to claim 43, wherein the induced plasma arc is present forward of the launch vehicle and rearward of the launch vehicle.

48. The launch system according to claim 36, wherein the launch tube comprises two electrically conductive tubes and two insulator tubes.

49. The launch system according to claim 48, wherein the launch tube comprises a tube bore surrounded by an inner insulator tube and an outer insulator tube separated by an inner electrically conductive tube and also comprises an outer electrically conductive tube exterior to the outer insulator tube.

50. The launch system according to claim 49, wherein the inner insulator tube and the inner electrically conductive tube are segmented along at least a portion of the length thereof.

51. The launch system according to claim 50, wherein the segments each include at least one switch configured to pass an electrical current from the launch bore to the inner electrically conductive tube.

52. The launch system according to claim 49, wherein the outer electrically conductive tube is in electrical connection with the launch tube bore proximate a terminal end of the launch tube.

53. The launch system according to claim 49, wherein the launch tube is configured for passage of electrical current through an induced plasma arc within the launch tube bore.

54. The launch system according to claim 53, wherein the system is configured for passage of electrical current forward through the outer electrically conductive tube and rearward through the launch tube bore and the one or more electrical conductors of the launch vehicle.

55. The launch system according to claim 54, wherein the system is configured for passage of the electrical current from the one or more electrical conductors of the launch vehicle through one or more switches positioned along the length of the inner insulator tube and into the inner electrically conductive tube.

56. The launch system according to claim 36, wherein the launch system is configured to be electroantimagnetic.

57. The launch system according to claim 36, wherein the electrical energy source comprises a battery bank.

58. The launch system according to claim 57, wherein the electrical energy source further comprises an inductor.

59. The launch system according to claim 36, wherein the electrical energy source comprises a beaming element configured to deliver a power beam.

60. The launch system according to claim 59, wherein the electrical energy source comprises a tracking element configured to track the launch vehicle in motion through the launch tube.

61. The launch system according to claim 59, wherein the launch tube comprises one or more passages along at least a portion of the length thereof, the one or more passages being configured to permit transmission of the power beam therethrough.

62. The launch system according to claim 59, wherein the power beam comprises a laser beam, a microwave beam, or a millimeter wave beam.

63. A method for launching a payload, the method comprising:
providing a launch system according to claim 36; and
electrically heating the propellant in the electrical heater of the launch vehicle to form the exiting exhaust at a velocity sufficient to accelerate the payload through and out of the launch tube.

64. The method of launching a payload according to claim 63, wherein the method comprises electrically heating the propellant in the electrical heater of the launch vehicle to form an expanding gas that accelerates the launch vehicle through the launch tube to a velocity of at least about 2,000 meters per second (m/s) with an acceleration force of about 2 to about 2,000 G's while limiting a magnetic field within the tube to no more than about 2 Tesla.

65. The method of launching a payload according to claim 63, comprising providing an electrical current of about 0.2 amps to about 2 million amps through the at least one electrically conductive tube of the launch tube.

66. The method of launching a payload according to claim 65, wherein the electrical current is provided to a first electrically conductive tube, passes from the first electrically conductive tube through a first sliding contact to the electrical heater of the launch vehicle, and passes from the electrical heater though a second sliding contact to a second electrically conductive tube.

67. The method of launching a payload according to claim 66, wherein the electrical current passes from the first electrically conductive tube to the first sliding contact and passes from the second sliding contact to the second electrically conductive tube via a plasma arc.

68. The method of launching a payload according to claim 65, wherein the electrical current is provided to at least one electrically conductive tube and passes forward through the electrically conductive tube toward a terminal end of the launch tube.

69. The method of launching a payload according to claim 68, wherein the electrical current passes from the at least one electrically conductive tube and into an open bore of the launch tube through which the electrical current passes to a first electrical conductor of the launch vehicle.

70. The method of launching a payload according to claim 69, wherein the electrical current passes through the open bore of the launch tube via a plasma arc.

71. The method of launching a payload according to claim 69, wherein the electrical current passes from the first electrical conductor of the launch vehicle to the electrical heater and passes away from the launch vehicle through a second electrical conductor of the launch vehicle.

72. The method of launching a payload according to claim 71, wherein the electrical current passing away from the launch vehicle moves rearward through the open bore of the launch tube to a rearward electrically conductive element.

73. The method of launching a payload according to claim 65, wherein the electrical current is provided to a first electrically conductive tube and passes forward through the first electrically conductive tube toward a terminal end of the launch tube.

74. The method of launching a payload according to claim 73, wherein the electrical current passes from the first electrically conductive tube and into an open bore of the launch tube through which the electrical current passes to a first electrical conductor of the launch vehicle via a plasma arc.

75. The method of launching a payload according to claim 74, wherein the electrical current passes from the first electrical conductor of the launch vehicle to the electrical heater and passes away from the launch vehicle through a second electrical conductor of the launch vehicle.

76. The method of launching a payload according to claim 75, wherein the electrical current passing away from the launch vehicle passes through one or more switches into a second electrically conductive tube and passes rearward therethrough.

77. The method of launching a payload according to claim 63, wherein the electrical energy source comprises a beaming element configured to deliver a power beam, and wherein the method comprising directing the power beam from the beaming element to the electrical heater of the launch vehicle through one or more passages in the launch tube.

78. The method of launching a payload according to claim 77, comprising tracking the power beam to the position of the launch vehicle as the launch vehicle accelerates through the launch tube such that the power beam is delivered to the launch vehicle at a plurality of positions along the length of the launch tube.

79. The method of launching a payload according to claim 77, wherein the power beam is a laser beam, a microwave beam, or a millimeter beam.

80. The method of launching a payload according to claim 63, comprising directing an energy beam to the atmosphere forward to the payload container after exiting the launch tube such that the energy beam heats the atmosphere forward to the payload container.

81. The method of launching a payload according to claim 80, wherein the atmosphere is explosively heated with a laser beam.

* * * * *